United States Patent
Lu et al.

(10) Patent No.: US 12,061,567 B2
(45) Date of Patent: Aug. 13, 2024

(54) METHOD, APPARATUS AND SYSTEM FOR IMPLEMENTING EXTERNAL DEVICE SIMULATING KEYBOARD

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 8 days.

(21) Appl. No.: 17/911,506

(22) PCT Filed: Aug. 25, 2021

(86) PCT No.: PCT/CN2021/114604
§ 371 (c)(1),
(2) Date: Sep. 14, 2022

(87) PCT Pub. No.: WO2022/078078
PCT Pub. Date: Apr. 21, 2022

(65) Prior Publication Data
US 2023/0359580 A1    Nov. 9, 2023

(30) Foreign Application Priority Data
Oct. 13, 2020    (CN) .......................... 202011087524.0

(51) Int. Cl.
*G06F 13/42*        (2006.01)
*G06F 13/38*        (2006.01)
(52) U.S. Cl.
CPC ........ *G06F 13/4282* (2013.01); *G06F 13/382* (2013.01); *G06F 2213/0042* (2013.01)

(58) Field of Classification Search
CPC ............... G06F 13/4282; G06F 13/382; G06F 2213/0042; G06F 1/1684; G06F 3/0227; G06F 13/126; G06F 21/44
See application file for complete search history.

(56) References Cited

U.S. PATENT DOCUMENTS

| | | | | |
|---|---|---|---|---|
| 2008/0066088 | A1* | 3/2008 | Lu | .......................... G06F 3/038 719/327 |
| 2008/0307096 | A1* | 12/2008 | Wang | ...................... G06F 15/16 709/227 |

(Continued)

FOREIGN PATENT DOCUMENTS

| | | |
|---|---|---|
| CN | 101212303 A | 7/2008 |
| CN | 101901058 A | 12/2010 |

(Continued)

OTHER PUBLICATIONS

International Search Report (with English Translation) and Written Opinion mailed Nov. 25, 2021, in corresponding to International Application No. PCT/CN2021/114604; 10 pages.

(Continued)

*Primary Examiner* — Farley Abad
(74) *Attorney, Agent, or Firm* — Maier & Maier, PLLC

(57) ABSTRACT

A method, an apparatus and a system for implementing an external device simulating a keyboard relates to the field of electronic technology. The external device generates key-value data in a case that a user pressing a key is detected, and sends a start command to an Apple device after receiving a data request sent by the Apple device. After receiving the start command, the Apple device exits a soft keyboard and continuously sends the data request to the external device. After receiving the data request, the external device sends an attaching report command including the key-value data to the Apple device. The Apple device displays the key-value data and continuously sends the data request to the external (Continued)

device. After receiving the data request, the external device sends an end command to the Apple device. The Apple device pops up the soft keyboard again after receiving the end command.

10 Claims, 4 Drawing Sheets

(56) References Cited

U.S. PATENT DOCUMENTS

| | | | | |
|---|---|---|---|---|
| 2015/0293869 | A1* | 10/2015 | Lu | G06F 13/4221 710/5 |
| 2016/0357692 | A1* | 12/2016 | Lu | G06F 13/4081 |
| 2018/0046588 | A1 | 2/2018 | Lu et al. | |

FOREIGN PATENT DOCUMENTS

| | | | |
|---|---|---|---|
| CN | 103092799 | A | 5/2013 |
| CN | 103455456 | A | 12/2013 |
| CN | 103678215 | A | 3/2014 |
| CN | 104778143 | A | 7/2015 |
| CN | 105144038 | A | 12/2015 |
| CN | 105933428 | A | 9/2016 |
| CN | 107329520 | A | 11/2017 |
| CN | 109799879 | A | 5/2019 |
| CN | 110730441 | A | 1/2020 |
| CN | 111580738 | A | 8/2020 |
| CN | 111698366 | A | 9/2020 |
| CN | 111930184 | A | 11/2020 |

OTHER PUBLICATIONS

First Office Action dated Nov. 23, 2020, corresponding to Chinese Application No. 202011087524.0, 23 pages (with English Translation).

Notification to Grant Patent Right for Invention dated Dec. 7, 2020, corresponding to Chinese Application No. 202011087524.0, 4 pages (with English Translation).

* cited by examiner

METHOD, APPARATUS AND SYSTEM FOR IMPLEMENTING EXTERNAL DEVICE SIMULATING KEYBOARD

This application is a National Stage of International Application No. PCT/CN2021/114604, filed Aug. 25, 2021, which claims priority to Chinese Patent Application No. 202011087524.0, filed to China National Intellectual Property Administration on Oct. 13, 2020, entitled "Method, Apparatus and System for Implementing External Device Simulating Keyboard", both of which are hereby incorporated by reference in their entireties.

TECHNICAL FIELD

The present disclosure relates to the field of electronic technology, and more particularly, to a method, an apparatus and a system for implementing an external device simulating a keyboard.

BACKGROUND

In the prior art, an APPLE device, which refers to a device using the iOS operating system, such as an iPhone or an iPad, can be connected to an external keyboard for use. However, when the external keyboard communicates with the APPLE device through a human interface device (HID) protocol, the soft keyboard of the APPLE device will conflict with the external keyboard, which leads to that the soft keyboard of the APPLE device cannot be used, which is very inconvenient for using.

SUMMARY

The purpose of the present disclosure is to provides a method, an apparatus and a system for implementing an external device simulating a keyboard in order to overcome deficiencies of the prior art.

The present disclosure provides a method for implementing an external device simulating a keyboard, and the method is applicable for an APPLE device, the method includes:

step T1, establishing, by the external device, a connection with the APPLE device, waiting for receiving a data request continuously sent by the APPLE device, returning response data to the APPLE device via a universal serial bus (USB) interface in a case that the external device receives the data request sent by the APPLE device via the USB interface and there is no data in a send cache of the external device, and performing step T2 in a case that a user pressing a key is detected in a process that the external device is waiting for receiving the data request continuously sent by the APPLE device;

step T2, generating, by the external device, key-value data, organizing a start command according to a preset HID identifier and storing the start command in the send cache, and setting a sending identifier as a first preset value; where the start command is used for declaring that the external device is a keyboard device;

step T3, in a case that the external device receives the data request sent by the APPLE device via the USB interface, determining, by the external device, whether the sending identifier is the first preset value; if yes, sending the start command in the send cache to the APPLE device via the USB interface and clearing the send cache, waiting for receiving the data request continuously sent by the APPLE device, and performing step T4; otherwise, returning response data to the APPLE device via the USB interface;

step T4, in a case that the external device detects that the send cache is cleared, generating, according to the key-value data, an attaching report command and storing the attaching report command in the send cache, and setting the sending identifier as a second preset value;

step T5, in a case that the external device receives the data request sent by the APPLE device via the USB interface, determining, by the external device, whether the sending identifier is the second preset value; if yes, sending the attaching report command in the send cache to the APPLE device via the USB interface and clearing the send cache, waiting for receiving the data request continuously sent by the APPLE device, and performing step T6; otherwise, returning response data to the APPLE device via the USB interface;

step T6, in a case that the external device detects that the send cache is cleared, organizing an end command and storing the end command in the send cache, and setting the sending identifier as a third preset value;

step T7, in a case that the external device receives the data request sent by the APPLE device via the USB interface, determining whether the sending identifier is the third preset value; if yes, sending the end command in the send cache to the APPLE device via the USB interface and clearing the send cache and the sending identifier, waiting for receiving the data request continuously sent by the APPLE device; otherwise, returning response data to the APPLE device via the USB interface.

Further, the step T1 includes: after the external device establishes a physical connection with the APPLE device via a LIGHTNING interface, performing hardware system initialization; receiving the data request continuously sent by the APPLE device, and returning response data to the APPLE device via the USB interface in a case that the external device receives the data request sent by the APPLE device via the USB interface and there is no data in the send cache.

The step T1 further includes: storing, by the external device, a detecting instruction in the send cache;

between the step T1 and the step T2, the method further includes:

step Z1, in a case that the external device receives the data request sent by the APPLE device via the USB interface, determining, by the external device, whether there is data in the send cache; if yes, sending the detecting instruction in the send cache to the APPLE device via the USB interface and receiving support authentication protocol information sent by the APPLE device, and negotiating synchronization packet data with the APPLE device; otherwise, returning, by the external device, response data to the APPLE device via the USB interface; and;

step Z2, in a case that the external device receives authentication success information and a device authentication instruction sent by the APPLE device via the USB interface, organizing, by the external device, an authentication response and storing the authentication response in the send cache, and returning the authentication response in the send cache to the APPLE device via the USB interface.

Before the step Z2, the method further includes:
in a case that the external device receives a certificate acquisition instruction sent by the APPLE device via the USB interface, reading, by the external device, a certificate from an internal authentication chip and storing the certificate in the send cache, and returning the certificate in the send cache to the APPLE device via the USB interface; and;
in a case that the external device receives a challenge instruction sent by the APPLE device via the USB interface, parsing, by the external device, the challenge instruction and sending a challenge value obtained by parsing to the internal authentication chip, reading a challenge value signature result from the internal authentication chip and storing the challenge value signature result in the send cache, and returning the challenge value signature result in the send cache to the APPLE device via the USB interface.

Further, the generating, according to the key-value data, an attaching report command and storing the attaching report command in the send cache in step T4 specifically is: converting the key-value data into key-pressing information, generating an attaching report command according to the key-pressing information and storing the attaching report command in the send cache.

The present disclosure further provides a method for implementing an external device simulating a keyboard, and the method is applicable for a system including an APPLE device and an external device. The method includes:
step S1, an APPLE device establishes a connection with an external device, the APPLE device continuously sends a data request to the external device, in a case that the external device receives the data request sent by the APPLE device via a USB interface and there is no data in a send cache of the external device, the external device returns response data to the APPLE device via the USB interface; the APPLE device authenticates the external device, performs step S2 in a case that the authentication is successful, and ends the procedure and reports error in a case that the authentication fails;
step S2, the APPLE device prompts a user to press a key on the external device; in a case that the user pressing a key is detected in a process that the external device is waiting for receiving the data request continuously sent by the APPLE device, the external device generates key-value data, organizes a start command according to a preset HID identifier and stores the start command in the send cache, sets a sending identifier as a first preset value, and performs step S3; where the start command is used for declaring that the external device is a keyboard device;
step S3, in a case that the external device receives the data request sent by the APPLE device via the USB interface, the external device determines whether the sending identifier is the first preset value, if yes, the external device sends the start command in the send cache to the APPLE device via the USB interface and clears the send cache, waits for receiving the data request continuously sent by the APPLE device; in a case that the external device detects that the send cache is cleared, the external device generates an attaching report command according to the key-value data and stores the attaching report command in the send cache, sets the sending identifier as a second preset value, and performs step S4; otherwise, the external device returns response data to the APPLE device via the USB interface;
step S4, the APPLE device exits a soft keyboard after receiving the start command, the APPLE device continuously sends the data request to the external device, and performs step S5;
step S5, in a case that the external device receives the data request sent by the APPLE device via the USB interface, the external device determines whether the sending identifier is a second preset value, if yes, the external device sends the attaching report command in the send cache to the APPLE device via the USB interface and clears the send cache, waits for receiving the data request continuously sent by the APPLE device; in a case that the external device detects that the send cache is cleared, the external device organizes an end command and stores the end command in the send cache, sets the sending identifier as a third preset value, and performs step S6; otherwise, the external device returns response data to the APPLE device via the USB interface;
step S6, the APPLE device displays the key-value data in the attaching report command after receiving the attaching report command, continuously sends the data request to the external device, and performs step S7;
step S7, in a case that the external device receives the data request sent by the APPLE device via the USB interface, the external device determines whether the sending identifier is a third preset value, if yes, the external device sends the end command in the send cache to the APPLE device via the USB interface and clears the send cache and the sending identifier, waits for receiving the data request sent by the APPLE device; otherwise, the external device returns response data to the APPLE device via the USB interface;
step S8, the APPLE device pops up the soft keyboard again after receiving the end command.

Further, in the step S1, before the APPLE device authenticates the external device, the method further includes:
step E1, the APPLE device detects whether it supports an authentication protocol, if yes, the APPLE device returns supporting authentication protocol information to the external device and performs step E2, otherwise, the APPLE device reports error and ends the procedure;
step E2, the external device negotiates synchronization packet data with the APPLE device after receiving the authenticating protocol information via the USB interface;
in the step S1, after the APPLE device authenticates the external device successfully, the method further includes:
step F1, the APPLE device sends a device authentication instruction to the external device; after receiving the device authentication instruction via the USB interface, the external device organizes an authentication response and stores the authentication response in the send cache; the external device returns the authentication response in the send cache to the APPLE device via the USB interface, and performs step S2.

Further, after the APPLE device establishes the connection with the external device, the method further includes: the external device stores a detecting instruction in the send cache;
the step E1 includes:
step E11, in a case that the external device receives the data request sent by the APPLE device via the USB interface, the external device determines whether there is data in the send cache, if yes, the external device sends the detect instruction in the send cache to the APPLE device; otherwise, the external device reports error and ends the procedure;

step E12, after the APPLE device receives the detecting instruction, the APPLE device determines whether it supports the authentication protocol, if yes, the APPLE device returns APPLE device supporting authentication protocol information to the external device, and performs step E2; otherwise, the APPLE device reports error and ends the procedure.

Further, the step E12 specifically is: after the APPLE device receives the detecting instruction, determines whether the protocol supported by itself includes the authentication protocol specified by the detecting instruction; if yes, the APPLE device returns APPLE device supporting authentication protocol information to the external device, and performs step E2; otherwise, the APPLE device reports error and ends the procedure.

Further, in the step S1, the APPLE device establishes a connection with the external device, and the APPLE device continuously sends a data request to the external device, includes:

step S11, the APPLE device establishes a physical connection with the external device via a LIGHTNING interface, and the external device performs hardware system initialization;

step S12, the APPLE device performs USB enumeration, and continuously sends a data request to the external device after the USB enumeration is completed.

Further, in the step S1, the APPLE device authenticates the external device, performs step S2 if the authentication is successful, and reports error and ends the procedure if the authentication fails, includes:

step A1, the APPLE device sends a certificate acquisition instruction to the external device;

step A2, in a case that the external device receives the certificate acquisition instruction sent by the APPLE device via the USB interface, the external device reads a certificate from an internal authentication chip and stores the certificate in the send cache, and returns the certificate in the send cache to the APPLE device via the USB interface;

step A3, the APPLE device authenticates the received certificate, performs step A4 if the authentication is successful, and reports error and ends the procedure if the authentication fails;

step A4, the APPLE device generates a challenge value, generates a challenge instruction according to the challenge value and sends the challenge instruction to the external device;

step A5, in a case that the external device receives the challenge instruction sent by the APPLE device via the USB interface, the external device parses the challenge instruction and sends the challenge value obtained by parsing to the internal authentication chip, reads a challenge value signature result from the internal authentication chip and stores the challenge value signature result in the send cache, and returns the challenge value signature result in the send cache to the APPLE device via the USB interface;

step A6, the APPLE device authenticates the received challenge value signature result, sends authentication success information to the external device in a case that the authentication is successful and performs step S2, reports error and ends the procedure in a case that the authentication fails;

Further, the step A3 includes: the APPLE device uses a stored public key to decrypt a signature value in the certificate to obtain a first decryption value, performs a hash operation on data to be signed in the certificate to obtain a first hash value, determines whether the first hash value is identical to the first decrypting value, if yes, the authentication of the certificate is successful, performs step A4; otherwise, the authentication fails, reports error and ends the procedure.

Further, the step A6 includes: the APPLE device uses a stored public key to decrypt the challenge value signature result to obtain a second decryption value, performs a second hash operation on the generated challenge value to obtain a second hash value, determines whether the second decrypting value is identical to the second hash value, if yes, the authentication is successful, sends authentication success information to the external device; otherwise, the authentication fails, reports error and ends the procedure.

Further, in the step S2, the APPLE device prompts a user to press a key on the external device is replaced with: an application browser of the APPLE device prompts the user to input a key-value data;

the step S6 is replaced with: the APPLE device sends the key-value data in the attaching report command to the browser after receiving the attaching report command, the browser performs corresponding operation after receiving the key-value data; and the APPLE device continues to send the data request to the external device.

Further, in the step S3, in a case that the external device detects that the send cache is cleared, the external device generates an attaching report command according to the key-value data and stores the attaching report command in the send cache specifically is: in a case that the external device detects that the send cache is cleared, the external device converts the key-value data into key-pressing information, generates an attaching report command according to the key-pressing information and stores the attaching report command in the send cache.

The present disclosure further provides an apparatus for implementing an external device simulating a keyboard; the apparatus is connected to an APPLE device to work; the apparatus includes:

a connecting and receiving and returning module, configured to implement a connection between the apparatus and the APPLE device, wait for receiving a data request continuously sent by the APPLE device, return response data to the APPLE device via a USB interface in a case that the apparatus receives the data request sent by the APPLE device via the USB interface and there is no data in a send cache of the apparatus;

a first detecting and organizing and storing module, configured to: in a case that a user pressing a key is detected in a process that the connecting and receiving and returning module is waiting for receiving the data request continuously sent by the APPLE device, generate key-value data, organize a start command according to a preset HID identifier and store the start command in the send cache, and set a sending identifier as a first preset value; where the start command is used for declaring that the apparatus is a keyboard device;

a first receiving and determining and sending module, configured to: in a case that the data request sent by the APPLE device is received via the USB, determine whether the sending identifier is the first preset value; if yes, send the start command in the send cache to the APPLE device via the USB interface and clear the send cache, wait for receiving the data request continuously sent by the APPLE device, and trigger a detecting and generating and storing module; otherwise, return response data to the APPLE device via the USB interface;

the detecting and generating and storing module, configured to: in a case that the send cache being cleared is detected, generate an attaching report command according to the key-value data and store the attaching report command in the send cache, and set the sending identifier as a second preset value;

a second receiving and determining and sending module, configured to: in a case that the data request sent by the APPLE device is received via the USB interface, determine whether the sending identifier is the second preset value; if yes, send the attaching report command in the send cache to the APPLE device via the USB interface and clear the send cache, wait for receiving the data request continuously sent by the APPLE device, and trigger a second detecting and organizing and storing module; otherwise, return response data to the APPLE device via the USB interface;

the second detecting and organizing and storing module, configured to: in a case that the send cache being cleared is detected, organize an end command and store the end command in the send cache, and set the sending identifier as a third preset value; and a third receiving and determining and sending module, configured to: in a case that the data request sent by the APPLE device is received via the USB interface, determine whether the sending identifier is the third preset value; if yes, send the end command in the send cache to the APPLE device via the USB interface and clear the send cache and the sending identifier, wait for receiving the data request continuously sent by the APPLE device; otherwise, return response data to the APPLE device via the USB interface.

Further, the connecting and receiving and returning module is specifically configured to: perform hardware system initialization after establishing a physical connection with the APPLE device via a LIGHTNING interface; receive the data request continuously sent by the APPLE device, and return response data to the APPLE device via the USB interface in a case that the data request sent by the APPLE device is received via the USB interface and there is no data in the send cache.

Further, the connecting and receiving and returning module is further configured to store a detecting instruction in the send cache;

the apparatus further includes:

a fourth receiving and determining and sending module, configured to: in a case that the data request sent by the APPLE device is received via the USB interface, determine whether there is data in the send cache; if yes, send the detecting instruction in the send cache to the APPLE device via the USB interface and receive support authentication protocol information sent by the APPLE device, negotiate synchronization packet data with the APPLE device; otherwise, return response data to the APPLE device via the USB interface; and a receiving and organizing and sending module, configured to: in a case that authentication success information and a device authentication instruction sent by the APPLE device are received via the USB interface, organize an authentication response and store the authentication response in the send cache, and return the authentication response in the send cache to the APPLE device via the USB interface.

Further, the apparatus further includes:

a receiving and reading and sending module, configured to: in a case that a certificate acquisition instruction sent by the APPLE device is received via the USB interface, read a certificate from an internal authentication chip and store the certificate in the send cache, and return the certificate in the send cache to the APPLE device via the USB interface; and a parsing and reading and sending module, configured to: in a case that a challenge instruction sent by the APPLE device is received via the USB interface, parse the challenge instruction and send a challenge value obtained by parsing to the internal authentication chip, read a challenge value signature result from the internal authentication chip and store the challenge value signature result in the send cache, and return the challenge value signature result in the send cache to the APPLE device via the USB interface.

Further, the detecting and generating and storing module is specifically configured to: in a case that the send cache being cleared is detected, convert the key-value data into key-pressing information, generate an attaching report command according to the key-pressing information and store the attaching report command in the send cache.

The present disclosure further provides a system for implementing an external device simulating a keyboard. The system includes an APPLE device and an external device; the APPLE device includes: a connecting and sending module, an authenticating module, a prompting module, a receiving and exiting and sending module, a receiving and displaying and sending module and a receiving and re-popping module; the external device includes: a first receiving and returning module, a first detecting and organizing and storing module, a first receiving and determining and sending module, a detecting and generating and storing module, a second receiving and determining and sending module, a second detecting and organizing and storing module and a third receiving and determining and sending module;

the connecting and sending module is configured to implement that the APPLE device is connected with the external device and continuously sends a data request to the external device;

the first receiving and returning module is configured to return response data to the APPLE device via a USB interface in a case that the data request sent by the APPLE device is received via the USB interface and there is no data in the send cache;

the authenticating module is configured to authenticate the external device; trigger the prompting module in a case that the authentication is successful; and report error and end the procedure in a case that the authentication fails;

the prompting module is configured to prompt a user to press a key on the external device;

the first detecting and organizing and storing module is configured to: in a case that the user pressing a key is detected, generate key-value data, organize a start command according to a preset HID identifier and store the start command in the send cache, set a sending identifier as a first preset value, and trigger the first receiving and determining and sending module; where the start command is used for declaring that the external device is a keyboard device;

the first receiving and determining and sending module is configured to: in a case that the data request sent by the APPLE device is received via the USB interface, determine whether the sending identifier is the first preset value, if yes, send the start command in the send cache to the APPLE device via the USB interface and clear the send cache, wait for receiving the data request continuously sent by the APPLE device, and trigger the detecting and generating and storing module; otherwise, return response data to the APPLE device via the USB interface;

the detecting and generating and storing module is configured to: in a case that the send cache being cleared is detected, generate an attaching report command according to the key-value data and store the attaching report command in the send cache, and set the sending identifier as a second preset value;

the receiving and exiting and sending module is configured to exit a soft keyboard after receiving the start command, send the data request to the external device, and trigger the second receiving and determining and sending module;

the second receiving and determining and sending module is configured to: in a case that the data request sent by the APPLE device is received via the USB interface, determine whether the sending identifier is a second preset value, if yes, send the attaching report command in the send cache to the APPLE device via the USB interface and clear the send cache, wait for receiving the data request continuously sent by the APPLE device, and trigger the second detecting and organizing and storing module; otherwise, return response data to the APPLE device via the USB interface;

the second detecting and organizing and storing module is configured to: in a case that the send cache being cleared is detected, organize an end command and store the end command in the send cache, and set the sending identifier as a third preset value;

the receiving and displaying and sending module is configured to display the key-value data in the attaching report command after receiving the attaching report command, continuously send the data request to the external device, and trigger the third receiving and determining and sending module;

the third receiving and determining and sending module is configured to: in a case that the data request sent by the APPLE device is received via the USB interface, determine whether the sending identifier is a third preset value, if yes, send the end command in the send cache to the APPLE device via the USB interface and clear the send cache and the sending identifier, wait for receiving the data request sent by the APPLE device; otherwise, return response data to the APPLE device via the USB interface;

the receiving and re-popping module is configured to pop up the soft keyboard again after receiving the end command.

Further, the APPLE device further includes a detecting and returning module and a first sending module, and the external device further includes a receiving and negotiating module and a receiving and organizing and storing module;

the detecting and returning module is configured to detect whether it supports an authentication protocol, if yes, return supporting authentication protocol information to the external device, otherwise, report error and end the procedure;

the receiving and negotiating module is configured to negotiate synchronization packet data with the APPLE device after receiving the authenticating protocol information via the USB interface;

the first sending module is configured to send a device authentication instruction to the external device after the authenticating module authenticates the external device successfully;

the receiving and organizing and storing module is configured to: after receiving the device authentication instruction via the USB interface, organize an authentication response and store the authentication response in the send cache; return the authentication response in the send cache to the APPLE device via the USB interface;

the prompting module is specifically configured to prompt a user to press a key on the external device in a case that the authentication response is received.

Further, the external device further includes:

a first storing module, configured to store a detecting instruction in the send cache after the APPLE device establishes the connection with the external device;

the detecting and returning module is specifically configured to: in a case that the data request sent by the APPLE device is received via the USB interface, determine whether there is data in the send cache, if yes, send the detect instruction in the send cache to the APPLE device; otherwise, report error and end the procedure;

the APPLE device further includes: a fourth receiving and determining and returning module, configured to: after receiving the detecting instruction, determine whether it supports the authentication protocol, if yes, return APPLE device supporting authentication protocol information to the external device, and trigger the receiving and negotiating module; otherwise, report error and end the procedure.

Further, the fourth receiving and determining and returning module is specifically configured to: after receiving the detecting instruction, determine whether the protocol supported by itself includes the authentication protocol specified by the detecting instruction; if yes, return APPLE device supporting authentication protocol information to the external device, and trigger the receiving and negotiating module; otherwise, report error and end the procedure.

Further, the connecting and sending module includes:

a connecting and initializing unit, configured to establishes a physical connection with the external device via a LIGHTNING interface, where the external device performs hardware system initialization; and an enumerating and sending unit, configured to perform USB enumeration, and continuously send a data request to the external device after the USB enumeration is completed.

Further, the authenticating module includes: a first sending unit, a first receiving and authenticating unit, a generating and sending unit and a second receiving and authenticating unit; the external device further includes: a receiving and reading and sending module and a parsing and reading and sending module;

the first sending unit is configured to send a certificate acquisition instruction to the external device;

the receiving and reading and sending module is configured to: in a case that the certificate acquisition instruction sent by the APPLE device is received via the USB interface, read a certificate from an internal authentication chip and store the certificate in the send cache, and return the certificate in the send cache to the APPLE device via the USB interface;

the first receiving and authenticating unit is configured to receive and authenticate the certificate; trigger the generating and sending unit in a case that the authentication is successful; and report error and end the procedure in a case that the authentication fails;

the generating and sending unit is configured to generate a challenge value, generate a challenge instruction according to the challenge value and send the challenge instruction to the external device;

the parsing and reading and sending module is configured to: in a case that the challenge instruction sent by the APPLE device is received via the USB interface, parse the challenge instruction and send the challenge value obtained by parsing to the internal authentication chip, read a challenge value signature result from the internal authentication chip and store the challenge value signature result in the send cache, and return the challenge value signature result in the send cache to the APPLE device via the USB interface;

the second receiving and authenticating unit is configured to receive and authenticate the challenge value signature result, send authentication success information to the external device in a case that the authentication is successful, and report error and end the procedure in a case that the authentication fails.

Further, the first receiving and authenticating unit is specifically configured to use a stored public key to decrypt a signature value in the certificate to obtain a first decrypting value, perform a hash operation on data to be signed in the certificate to obtain a first hash value, determine whether the first hash value is identical to the first decrypting value; if yes, the authentication is successful, trigger the generating and sending unit; otherwise, the authentication fails, report error and end the procedure.

Further, the second receiving and authenticating unit is specifically configured to receive the challenge value signature result, use a stored public key to decrypt the challenge value signature result to obtain a second decrypting value, perform a hash operation on the generated challenge value to obtain a second hash value, determine whether the second decrypting value is identical to the second hash value; if yes, the authentication is successful, send authentication success information to the external device; otherwise, the authenticating fails, report error and end the procedure.

Further, the prompting module is further configured to prompt a user to input key-value data via an application browser of the APPLE device;

the receiving and displaying and sending module is further configured to send the key-value data in the attaching report command to the browser after receiving the attaching report command; the browser performs corresponding operation after receiving the key-value data; the receiving and displaying and sending module is further configured to continue to send the data request to the external device.

Further, the detecting and generating and storing module is specifically configured to: in a case that the external device detects that the send cache is cleared, convert the key-value data into key-pressing information, generate an attaching report command according to the key-pressing information and store the attaching report command in the send cache.

Comparing with the prior art, the present disclosure has following advantages:

through the technical solutions of the present disclosure, when an external device is connected with an APPLE device, the external device can simulate a keyboard and an APPLE soft keyboard can be used normally as well, which reduces the conflict between the soft keyboard of the APPLE device and the keyboard simulated by the external device, and reduces the burden of the APPLE device, which is convenient for using by a user.

DETAILED DESCRIPTION OF THE EMBODIMENTS

The technical solutions in the embodiments of the present disclosure will be clearly and completely described in the following with reference to the accompanying drawings in the embodiments of the present disclosure. It is obvious that the described embodiments are only a part of the embodiments of the present disclosure, but not all embodiments. All other embodiments obtained by those skilled in the art based on the embodiments of the present disclosure without inventive efforts are within the scope of the present disclosure.

In the embodiment, after the APPLE device establishes a connection for communication with the external device and completes an enumeration, the APPLE device will continuously send a data request to the external device when it is idle. In a case that the external device receives the data request via a USB interface and there is no data in a send cache of the external device, the external device returns a confirmation response to the APPLE device via the USB interface, and in a case that the external device has an instruction to send to the APPLE device, the external device sends a corresponding instruction to the APPLE device via the USB interface. For example, the external device in the embodiment may be a device with a one time password (OTP) function.

Embodiment 1

Figure 1:
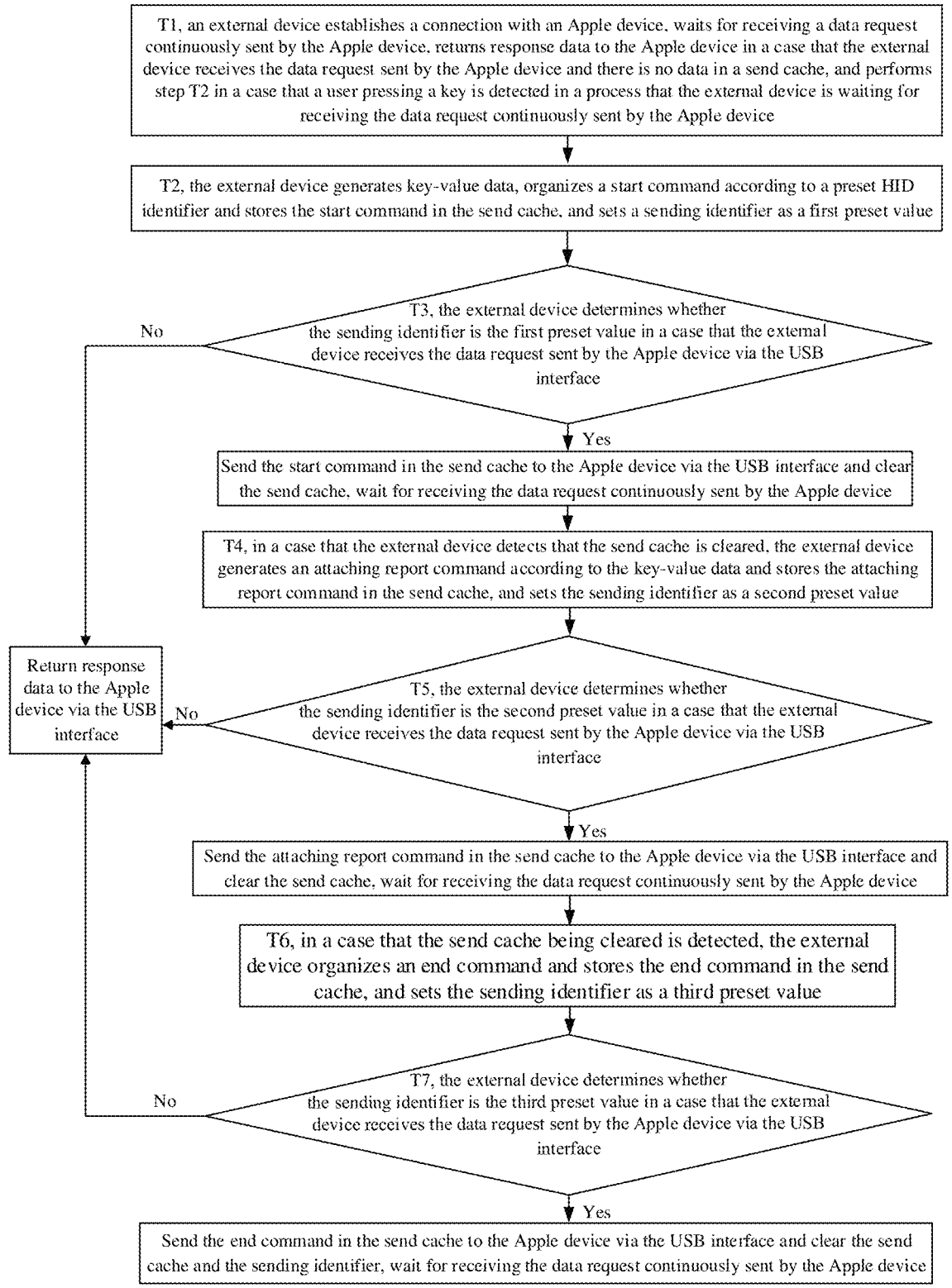
FIG. 1 is a flowchart of a method for implementing an external device simulating a keyboard according to Embodiment 1 of the present disclosure.

Embodiment 1 of the present disclosure provides a method for implementing an external device simulating a keyboard and the method is applicable for an APPLE device. As shown in FIG. 1, the method includes the following steps.

Step T1, an external device establishes a connection with the APPLE device, waits for and receives a data request continuously sent by the APPLE device, returns response data to the APPLE device in a case that the external device receives the data request sent by the APPLE device and there is no data in a send cache of the external device, and performs step T2 in a case that a user pressing a key is detected in a process that the external device is waiting for receiving the data request continuously sent by the APPLE device.

Specifically, in the embodiment, the step T1 includes: after the external device establishes a physical connection with the APPLE device via a LIGHTNING interface, the external device performs hardware system initialization; receives the data request continuously sent by the APPLE device, and returns response data to the APPLE device via the USB interface in a case that the external device receives the data request sent by the APPLE device via the USB interface and there is no data in the send cache.

Step T2, the external device generates key-value data, organizes a start command according to a preset HID identifier and stores the start command in the send cache, and sets a sending identifier as a first preset value.

The start command in the embodiment is used for declaring that the external device is a keyboard device; the preset HID identifier includes a HID identification code and a HID report descriptor.

Step T3, in a case that the external device receives the data request sent by the APPLE device via the USB interface, the external device determines whether the sending identifier is the first preset value; if yes, sends the start command in the send cache to the APPLE device via the USB interface and clears the send cache, waits for receiving the data request continuously sent by the APPLE device, and performs step T4; otherwise, returns response data to the APPLE device via the USB interface.

Step T4, in a case that the external device detects that the send cache is cleared, the external device generates an attaching report command according to the key-value data and stores the attaching report command in the send cache, and sets the sending identifier as a second preset value.

Specifically, in the embodiment, the generating an attaching report command according to the key-value data and storing the attaching report command in the send cache in step T4 specifically is: converting the key-value data into key-pressing information, generating an attaching report command according to the key-pressing information and storing the attaching report command in the send cache.

Step T5, in a case that the external device receives the data request sent by the APPLE device via the USB interface, the external device determines whether the sending identifier is the second preset value; if yes, sends the attaching report command in the send cache to the APPLE device via the USB interface and clears the send cache, waits for receiving the data request continuously sent by the APPLE device, and performs step T6; otherwise, returns response data to the APPLE device via the USB interface.

Step T6, in a case that the send cache being cleared is detected, the external device organizes an end command and stores the end command in the send cache, and sets the sending identifier as a third preset value.

Step T7, in a case that the external device receives the data request sent by the APPLE device via the USB interface, the external device determines whether the sending identifier is the third preset value; if yes, sends the end command in the send cache to the APPLE device via the USB interface and clears the send cache and the sending identifier, waits for receiving the data request continuously sent by the APPLE device; otherwise, returns response data to the APPLE device via the USB interface.

Optionally, the step T1 in the embodiment further includes: the external device stores a detecting instruction in the send cache; and between step T1 and step T2, the method further includes:

step Z1, in a case that the external device receives the data request sent by the APPLE device via the USB interface, the external device determines whether there is data in the send cache; if yes, sends the detecting instruction in the send cache to the APPLE device via the USB interface and receives support authentication protocol information sent by the APPLE device, and negotiates synchronization packet data with the APPLE device; otherwise, returns response data to the APPLE device via the USB interface; and step Z2, in a case that the external device receives authentication success information and a device authentication instruction sent by the APPLE device via the USB interface, the external device organizes an authentication response and stores the authentication response in the send cache, and returns the authentication response in the send cache to the APPLE device via the USB interface.

In the embodiment, before the step Z2, the method further includes:

in a case that the external device receives a certificate acquisition instruction sent by the APPLE device via the USB interface, the external device reads a certificate from an internal authentication chip and stores the certificate in the send cache, and returns the certificate in the send cache to the APPLE device via the USB interface; and in a case that the external device receives a challenge instruction sent by the APPLE device via the USB interface, the external device parses the challenge instruction and sends a challenge value obtained by parsing to the internal authentication chip, reads a challenge value signature result from the internal authentication chip and stores the challenge value signature result in the send cache, and returns the challenge value signature result in the send cache to the APPLE device via the USB interface.

In the embodiment, in a case that the send cache being cleared is detected when the external device receives the data request sent by the APPLE device via the USB interface, the external device returns response data to the APPLE device via the USB interface.

Embodiment 2

Figure 2:
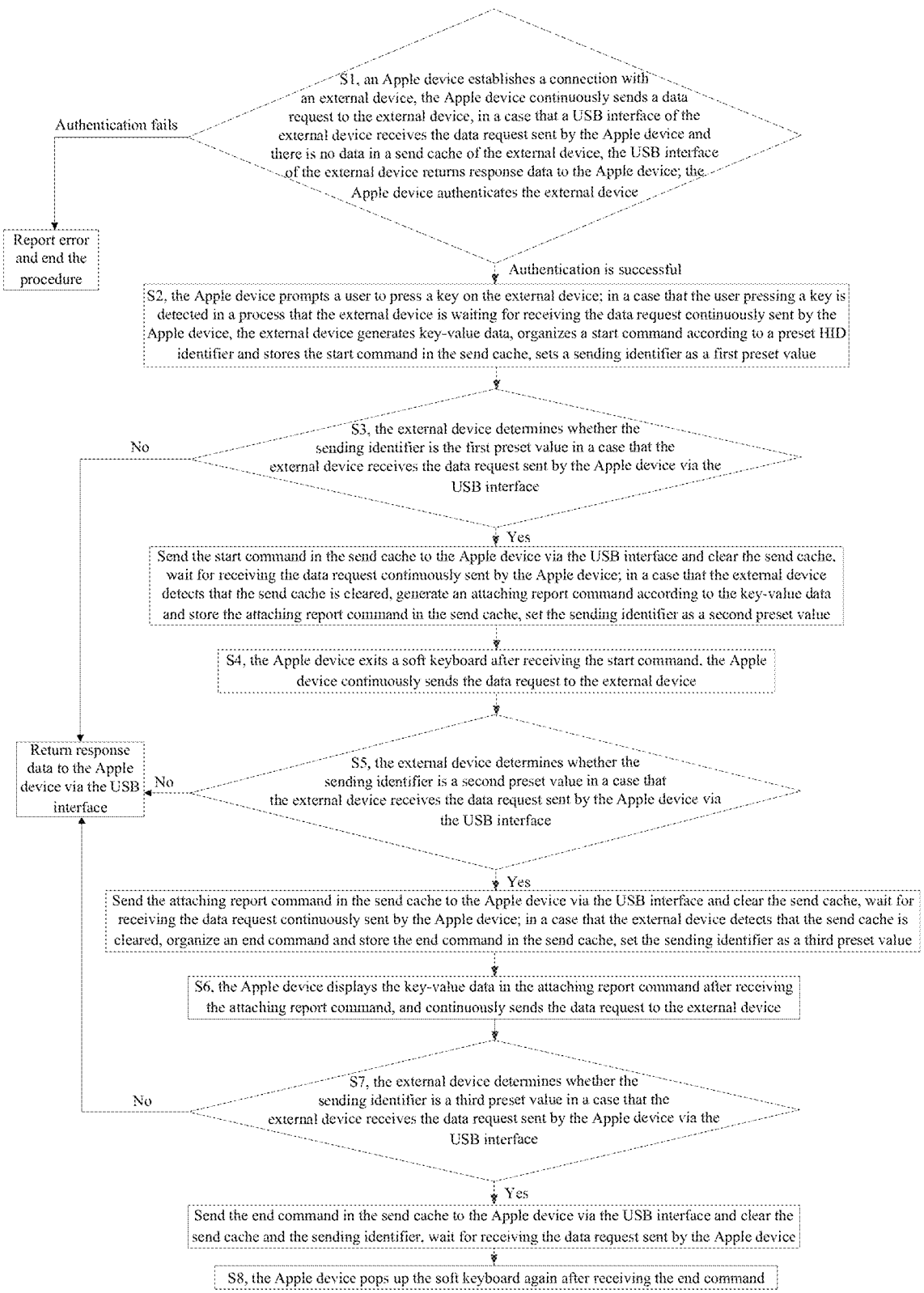
FIG. 2 is a flowchart of a method for implementing an external device simulating a keyboard according to Embodiment 2 of the present disclosure.

Embodiment 2 of the present disclosure provides a method for implementing an external device simulating a keyboard, the method of the embodiment is applicable for a system including an APPLE device and an external device. As shown in FIG. 2, the method of the embodiment includes the following steps.

Step S1, an APPLE device establishes a connection with an external device, the APPLE device continuously sends a data request to the external device, in a case that a USB interface of the external device receives the data request sent by the APPLE device and there is no data in a send cache of the external device, the USB interface of the external device returns response data to the APPLE device; the APPLE device authenticates the external device, performs step S2 in a case that the authentication is successful, and reports error and ends the procedure in a case that the authentication fails.

In the embodiment, the APPLE device establishes a connection for communication with the external device, the APPLE device continuously sends data request to the external device, includes:

step S11, the APPLE device establishes a physical connection with the external device via a LIGHTNING interface, and the external device performs hardware system initialization;

step S12, the APPLE device performs USB enumeration, and continuously sends a data request to the external device after the USB enumeration is completed.

In the above step, the APPLE device authenticates the external device, performs step S2 if the authentication is successful, and reports error and ends the procedure if the authentication fails, includes the following steps.

Step A1, the APPLE device sends a certificate acquisition instruction to the external device;

Step A2, in a case that the external device receives the certificate acquisition instruction sent by the APPLE device via the USB interface, the external device reads a certificate from an internal authentication chip and stores the certificate in the send cache, and returns the certificate in the send cache to the APPLE device via the USB interface.

Step A3, the APPLE device authenticates the received certificate, performs step A4 if the authentication is successful, and reports error and ends the procedure if the authentication fails.

Further, the step A3 includes: the APPLE device uses a stored public key to decrypt a signature value in the certificate to obtain a first decryption value, performs a hash operation on data to be signed in the certificate to obtain a first hash value, determines whether the first hash value is identical to the first decrypting value, if yes, the authentication of the certificate is successful, performs step A4; otherwise, the authentication fails, reports error and ends the procedure.

Step A4, the APPLE device generates a challenge value, generates a challenge instruction according to the challenge value and sends the challenge instruction to the external device.

Step A5, in a case that the external device receives the challenge instruction sent by the APPLE device via the USB interface, the external device parses the challenge instruction and sends the challenge value obtained by parsing to the internal authentication chip, reads a challenge value signature result from the internal authentication chip and stores the challenge value signature result in the send cache, and returns the challenge value signature result in the send cache to the APPLE device via the USB interface.

Step A6, the APPLE device authenticates the received challenge value signature result, sends authentication success information to the external device in a case that the authentication is successful, reports error and ends the procedure in a case that the authentication fails.

Further, the step A6 includes: the APPLE device uses a stored public key to decrypt the challenge value signature result to obtain a second decryption value, performs a hash operation on the generated challenge value to obtain a second hash value, determines whether the second decrypting value is identical to the second hash value, if yes, the authentication is successful, sends authentication success information to the external device; otherwise, the authentication fails, reports error and ends the procedure.

Step S2, the APPLE device prompts a user to press a key on the external device; in a case that the user pressing a key is detected in a process that the external device is waiting for receiving the data request continuously sent by the APPLE device, the external device generates key-value data, organizes a start command according to a preset HID identifier and stores the start command in the send cache, sets a sending identifier as a first preset value.

The start command in the embodiment is used for declaring that the external device is a keyboard device, and the preset HID identifier includes a HID identification code and a HID report descriptor.

Step S3, in a case that the external device receives the data request sent by the APPLE device via the USB interface, the external device determines whether the sending identifier is the first preset value, if yes, the external device sends the start command in the send cache to the APPLE device via the USB interface and clears the send cache, waits for receiving the data request continuously sent by the APPLE device; in a case that the external device detects that the send cache is cleared, the external device generates an attaching report command according to the key-value data and stores the attaching report command in the send cache, sets the sending identifier as a second preset value, and performs step S4; otherwise, the external device returns response data to the APPLE device via the USB interface.

In the embodiment, the generating an attaching report command according to the key-value data and stores the attaching report command in the send cache in step S3 specifically is: converting the key-value data into key-pressing information, generating an attaching report command according to the key-pressing information and storing the attaching report command in the send cache.

Step S4, the APPLE device exits a soft keyboard after receiving the start command, the APPLE device continuously sends the data request to the external device, and performs step S5.

Step S5, in a case that the external device receives the data request sent by the APPLE device via the USB interface, the external device determines whether the sending identifier is a second preset value, if yes, the external device sends the attaching report command in the send cache to the APPLE device via the USB interface and clears the send cache, waits for receiving the data request continuously sent by the APPLE device; in a case that the external device detects that the send cache is cleared, the external device organizes an end command and stores the end command in the send cache, sets the sending identifier as a third preset value, and performs step S6; otherwise, the external device returns response data to the APPLE device via the USB interface.

Step S6, the APPLE device displays the key-value data in the attaching report command after receiving the attaching report command, continuously sends the data request to the external device, and performs step S7.

Step S7, in a case that the external device receives the data request sent by the APPLE device via the USB interface, the external device determines whether the sending identifier is a third preset value, if yes, the external device sends the end command in the send cache to the APPLE device via the USB interface and clears the send cache and the sending identifier, waits for receiving the data request sent by the APPLE device; otherwise, the external device returns response data to the APPLE device via the USB interface.

Step S8, the APPLE device pops up the soft keyboard again after receiving the end command.

Optionally, in the step S1 of the embodiment, before the APPLE device authenticates the external device, the method further includes the following steps.

Step E1, the APPLE device detects whether it supports an authentication protocol, if yes, the APPLE device returns supporting authentication protocol information to the external device and performs step E2, otherwise, the APPLE device reports error and ends the procedure.

Further, after the APPLE device establishes the connection with the external device, the method further includes: the external device stores a detecting instruction in the send cache; correspondingly, the step E1 includes:

step E11, in a case that the external device receives the data request sent by the APPLE device via the USB interface, the external device determines whether there is data in the send cache, if yes, the external device sends the detect instruction in the send cache to the APPLE device; otherwise, the external device reports error and ends the procedure;

step E12, after the APPLE device receives the detecting instruction, the APPLE device determines whether it supports the authentication protocol, if yes, the APPLE device returns APPLE device supporting authentication protocol information to the external device, and performs step E2; otherwise, the APPLE device reports error and ends the procedure.

The step E12 specifically is: after the APPLE device receives the detecting instruction, determines whether the protocol supported by itself includes the authentication protocol specified by the detecting instruction; if yes, the APPLE device returns APPLE device supporting authentication protocol information to the external device, and performs step E2; otherwise, the APPLE device reports error and ends the procedure. Optionally, the reporting error in this step may be: returning information that the APPLE device does not support the authentication protocol.

Step E2, the external device negotiates synchronization packet data with the APPLE device after receiving the authenticating protocol information via the USB interface.

In the step S1, after the APPLE device authenticates the external device successfully, the method further includes:

step F1, the APPLE device sends a device authentication instruction to the external device; after receiving the device authentication instruction via the USB interface, the external device organizes an authentication response and stores the authentication response in the send cache; the external device returns the authentication response in the send cache to the APPLE device via the USB interface, and performs step S2.

Optionally, the step S2 in the embodiment is replaced with: an application browser of the APPLE device prompts the user to input a key-value data; in a case that the user pressing a key is detected in a process that the external device is waiting for receiving the data request continuously sent by the APPLE device, the external device generates key-value data, organizes a start command according to a preset HID identifier and stores the start command in the send cache, sets a sending identifier as a first preset value, and performs step S3.

Correspondingly, the step S6 is replaced with: the APPLE device sends the key-value data in the attaching report command to the browser after receiving the attaching report command, the browser performs corresponding operation after receiving the key-value data; and the APPLE device continues to send the data request to the external device.

In the embodiment, in a case that the send cache being cleared is detected when the external device receives the data request sent by the APPLE device via the USB interface, the external device returns response data to the APPLE device via the USB interface.

In the embodiment, when the APPLE device receives the response data returned by the external device, the APPLE device continuously sends data request to the external device.

Embodiment 3

Figure 3:
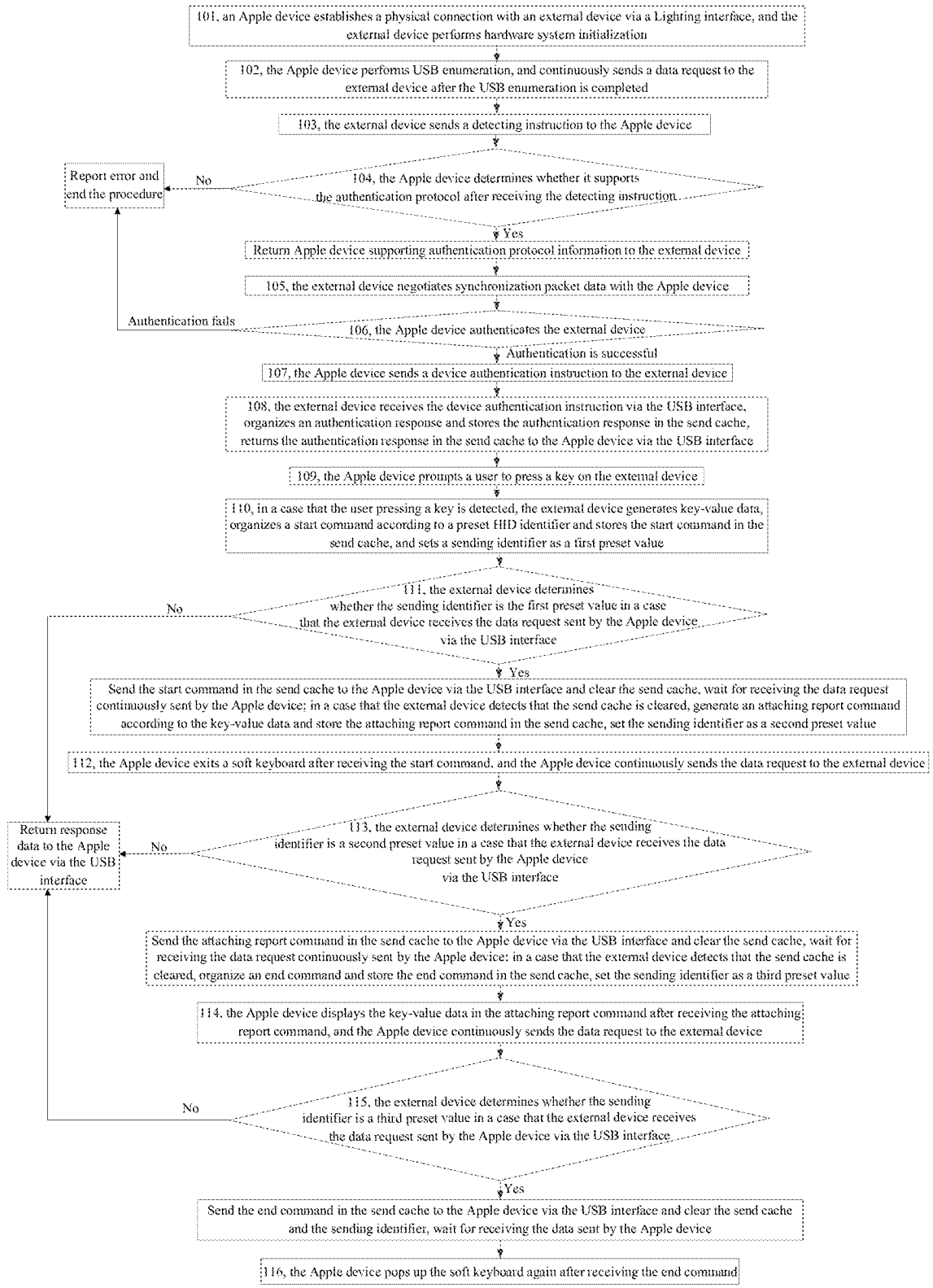
FIG. 3 is a flowchart of a method for implementing an external device simulating a keyboard according to Embodiment 3 of the present disclosure.

Embodiment 3 of the present disclosure provides a method for implementing an external device simulating a keyboard. As shown in FIG. 3, the method includes the following steps.

Step 101, an APPLE device establishes a physical connection with an external device via a LIGHTNING interface; the external device performs hardware system initialization.

Step 102, the APPLE device performs USB enumeration, and continuously sends a data request to the external device after the USB enumeration is completed.

Step 103, the external device sends a detecting instruction to the APPLE device.

For example, the detecting instruction in the Embodiment is: 0xFF, 0x55, 0x02, 0x00, 0xEE, 0x10;

Step 104, after the APPLE device receives the detecting instruction, the APPLE device determines whether it supports the authentication protocol, if yes, the APPLE device returns APPLE device supporting authentication protocol information to the external device, and performs step 105; otherwise, the APPLE device reports error and ends the procedure.

In the embodiment, the step 104 specifically is: after the APPLE device receives the detecting instruction, determines whether the protocol supported by itself includes the authentication protocol specified by the detecting instruction; if yes, the APPLE device returns APPLE device supporting authentication protocol information to the external device, and performs step 104; otherwise, the APPLE device reports error and ends the procedure. For example, the reporting error in this step is: the APPLE device returns information that the APPLE device does not support the authentication protocol to the external device; the authentication protocol may be IAP2;

The APPLE device supporting authentication protocol information that the APPLE device returns to the external device is: 0xFF, 0x55, 0x02, 0x00, 0xEE, 0x10.

The information that the APPLE device does not support the authentication protocol that the APPLE device returns to the external device is: 0x55, 0x04, 0x00, 0x02, 0x04, 0xEE, 0x08 or 0x55, 0x02, 0x00, 0x00, 0xFE or 0xFF, 0x55, 0x04, 0x00, 0x02, 0x04, 0xEE, 0x08 or 0xFF, 0x55, 0x02, 0x00, 0x00, 0xFE.

Step 105, the external device negotiates synchronization packet data with the APPLE device.

Specifically, in the embodiment, the external device sends a negotiating data request to the APPLE device, and the APPLE device returns negotiating data to the external device.

The negotiating data request sent by the external device to the APPLE device is: 0xFF, 0x5A, 0x00, 0x1A, 0x80, 0x1C, 0x00, 0x00, 0xF1, 0x01, 0x01, 0x04, 0x80, 0x03, 0xE8, 0x00, 0x0A, 0x1E, 0x01, 0x01, 0x00, 0x01, 0x02, 0x02, 0x01, 0x5F.

The negotiating data sent by the APPLE device to the external device is: 0xFF, 0x5A, 0x00, 0x1A, 0xC0, 0xE7, 0x1C, 0x00, 0xCA, 0x01, 0x7F, 0xFF, 0xFF, 0x03, 0xE8, 0x00, 0x0A, 0x1E, 0x01, 0x01, 0x00, 0x01, 0x02, 0x02, 0x01, 0x67.

Step 106, the APPLE device authenticates the external device, performs step 107 if the authentication is successful; reports error and ends procedure if the authentication fails.

Specifically, in the embodiment, the step 106 includes the following steps.

Step 106-1, the APPLE device sends a certificate acquisition instruction to the external device.

For example, the certificate acquisition instruction in the embodiment is: 0xFF, 0x5A, 0x00, 0x10, 0x40, 0xE8, 0x1C, 0x01, 0x52, 0x40, 0x40, 0x00, 0x06, 0xAA, 0x00, 0xD0.

Step 106-2, after receiving the certificate acquisition instruction via the USB interface, the external device reads a certificate from an internal authentication chip and returns certificate response data including the certificate to the APPLE device via the USB interface.

For example, the certificate response data in the embodiment is: 0xFF, 0x5A, 0x03, 0xA0, 0x40, 0x1D, 0xE8, 0x01, 0xBE, 0x40, 0x40, 0x03, 0x96, 0xAA, 0x01, 0x03, 0x90, 0x00, 0x00, 0x30, 0x82, 0x03, 0x88, 0x06, 0x09, 0x2A, 0x86, 0x48, 0x86, 0xF7, 0x0D, 0x01, 0x 07, 0x02, 0xA0, 0x82, 0x03, 0x79, 0x30, 0x82, 0x03, 0x75, 0x02, 0x01, 0x01, 0x31, 0x00, 0x30, 0x0B, 0x06, 0x09, 0x2A, 0x86, 0x48, 0x86, 0xF7, 0x0D, 0x01, 0x07, 0x01, 0xA0, 0x82, 0x03, 0x5D, 0x30, 0x82, 0x03, 0x59, 0x30, 0x82, 0x02, 0x41, 0xA0, 0x03, 0x02, 0x01, 0x02, 0x02, 0x0F, 0x22, 0x22, 0xA A, 0x16, 0x03, 0x17, 0xAA, 0x06, 0xAA, 0x91, 0x92, 0xAA, 0x13, 0x79, 0x06, 0x30, 0x0D, 0x06, 0x0 9, 0x2A, 0x86, 0x48, 0x86, 0xF7, 0x0D, 0x01, 0x01, 0x05, 0x05, 0x00, 0x30, 0x81, 0x83, 0x31, 0x0B, 0x30, 0x09, 0x06, 0x03, 0x55, 0x04, 0x06, 0x13, 0x02, 0x55, 0x53, 0x31, 0x13, 0x30, 0x11, 0x06, 0x0 3, 0x55, 0x04, 0x0A, 0x13, 0x0A, 0x41, 0x70, 0x70, 0x6C, 0x65, 0x20, 0x49, 0x6E, 0x63, 0x2E, 0x31, 0x26, 0x30, 0x24, 0x06, 0x03, 0x55, 0x04, 0x0B, 0x13, 0x1D, 0x41, 0x70, 0x70, 0x6C, 0x65, 0x20, 0x 43, 0x65, 0x72, 0x74, 0x69, 0x66, 0x69, 0x63, 0x61, 0x74, 0x69, 0x6F, 0x6E, 0x20, 0x41, 0x75, 0x74, 0x68, 0x6F, 0x72, 0x69, 0x74, 0x79, 0x31, 0x37, 0x30, 0x35, 0x06, 0x03, 0x55, 0x04, 0x03, 0x13, 0x2E, 0x41, 0x70, 0x70, 0x6C, 0x65, 0x20, 0x69, 0x50, 0x6F, 0x64, 0x20, 0x41, 0x63, 0x63, 0x65, 0x73, 0x7 3, 0x6F, 0x72, 0x69, 0x65, 0x73, 0x20, 0x43, 0x65, 0x72, 0x74, 0x69, 0x66, 0x69, 0x63, 0x61, 0x74, 0x 69, 0x6F, 0x6E, 0x20, 0x41, 0x75, 0x74, 0x68, 0x6F, 0x72, 0x69, 0x74, 0x79, 0x30, 0x1E, 0x17, 0x0D, 0x31, 0x36, 0x30, 0x33, 0x31, 0x38, 0x31, 0x33, 0x35, 0x32, 0x35, 0x38, 0x5A, 0x17, 0x0D, 0x32, 0x 32, 0x30, 0x32, 0x31, 0x34, 0x32, 0x32, 0x31, 0x38, 0x30, 0x38, 0x5A, 0x30, 0x70, 0x31, 0x0B, 0x30, 0x09, 0x06, 0x03, 0x55, 0x04, 0x06, 0x13, 0x02, 0x55, 0x53, 0x31, 0x13, 0x30, 0x11, 0x06, 0x03, 0x5 5, 0x04, 0x0A, 0x0C, 0x0A, 0x41, 0x70, 0x70, 0x6C, 0x65, 0x20, 0x49, 0x6E, 0x63, 0x2E, 0x31, 0x1F, 0x30, 0x1D, 0x06, 0x03, 0x55, 0x04, 0x0B, 0x0C, 0x16, 0x41, 0x70, 0x70, 0x6C, 0x65, 0x20, 0x69, 0x 50, 0x6F, 0x64, 0x20, 0x41, 0x63, 0x63, 0x65, 0x73, 0x73, 0x6F, 0x72, 0x69, 0x65, 0x73, 0x31, 0x2B, 0x30, 0x29, 0x06, 0x03, 0x55, 0x04, 0x03, 0x0C, 0x22, 0x49, 0x50, 0x41, 0x5F, 0x32, 0x32, 0x32, 0x3 2, 0x41, 0x41, 0x31, 0x36, 0x30, 0x33, 0x31, 0x37, 0x41, 0x41, 0x30, 0x36, 0x41, 0x41, 0x39, 0x31, 0x 39, 0x32, 0x41, 0x41, 0x31, 0x33, 0x37, 0x39, 0x30, 0x36, 0x30, 0x81, 0x9F, 0x30, 0x0D, 0x06, 0x09, 0x2A, 0x86, 0x48, 0x86, 0xF7, 0x0D, 0x01, 0x01, 0x01, 0x05, 0x00, 0x03, 0x81, 0x8D, 0x00, 0x30, 0x81, 0x89, 0x02, 0x81, 0x81, 0x00, 0x90, 0x27, 0x5E, 0xB3, 0x05, 0xF9, 0xD3, 0x11, 0xC6, 0x92, 0x4A, 0xAF, 0x49, 0x1B, 0x33, 0x33, 0x21, 0x84, 0x28, 0x54, 0x95, 0x69, 0x8C, 0xD9, 0xFB, 0x28, 0x02, 0x86, 0xED, 0xA0, 0xAA, 0xAA, 0x7F, 0x2D, 0xF8, 0x11, 0xF5, 0x13, 0xDE, 0xD4, 0x7E, 0x2D, 0x FD, 0x73, 0xC9, 0x8E, 0xDA, 0x62, 0x57, 0x1A, 0x8B, 0x0F, 0x0E, 0xF8, 0x14, 0x58, 0x4B, 0xDC, 0xB5, 0x3D, 0xEB, 0xAD, 0xDF, 0x97, 0x96, 0xA8, 0x97, 0xD0, 0xD1, 0xDB, 0x8D, 0x76, 0x05, 0xA 9, 0xA8, 0x66, 0xA2, 0x45, 0x42, 0xB4, 0x99, 0xC9, 0x6F, 0x57, 0x1B, 0xEF, 0x61, 0xE7, 0x24, 0x6A, 0x6D, 0x0A, 0x38, 0xF4, 0x77, 0x67, 0x12, 0x90, 0x0B, 0x26, 0xD4, 0x99, 0xA6, 0x50, 0x7D, 0x5D, 0xA6, 0x70, 0x10, 0x56, 0xEA, 0xBC, 0x90, 0xD4, 0x91, 0x0C, 0x9E, 0x6C, 0xD5, 0x0E, 0xF3, 0xD A, 0xCF, 0x3A, 0x77, 0x37, 0x94, 0xB1, 0x02, 0x03, 0x01, 0x00, 0x01, 0xA3, 0x60, 0x30, 0x5E, 0x30, 0x1D, 0x06, 0x03, 0x55, 0x1D, 0x0E, 0x04, 0x16, 0x04, 0x14, 0xFC, 0x0x5A, 0x9A, 0x24, 0x4C, 0xE8, 0x92, 0xE9, 0xE8, 0xE8, 0x63, 0xFA, 0xAD, 0x1F, 0xBE, 0xFA, 0x06, 0x55, 0x8A, 0xE9, 0x30, 0x0C, 0x06, 0x03, 0x55, 0x1D, 0x13, 0x01, 0x01, 0xFF, 0x04, 0x02, 0x30, 0x00, 0x30, 0x1F, 0x06, 0x03, 0x 55, 0x1D, 0x23, 0x04, 0x18, 0x30, 0x16, 0x80, 0x14, 0xFF, 0x4B, 0x1A, 0x43, 0x9A, 0xF5, 0x19, 0x9 6, 0xAB, 0x18, 0x00, 0x2B, 0x61, 0xC9, 0xEE, 0x40, 0x9D, 0x8E, 0xC7, 0x04, 0x30, 0x0E, 0x06, 0x0 3, 0x55, 0x1D, 0x0F, 0x01, 0x0, 0xFF, 0x04, 0x04, 0x03, 0x02, 0x03, 0xB8, 0x30, 0x0D, 0x06, 0x09, 0x2A, 0x86, 0x48, 0x86, 0xF7, 0x0D, 0x01, 0x01, 0x05, 0x05, 0x00, 0x03, 0x82, 0x01, 0x01, 0x00, 0x 5E, 0x9B, 0x19, 0xFC, 0x0E, 0x71, 0xD7, 0x5F, 0x9B, 0x3D, 0xB9, 0x3C, 0x77, 0xFA, 0xF9, 0xF9, 0x 03, 0x32, 0xFC, 0x61, 0xCE, 0xCD, 0x07, 0x00, 0x9A, 0xA7, 0x20, 0x16, 0xD2, 0x4D, 0x67, 0x17, 0x 1D, 0x2C, 0x2B, 0x27, 0x9A, 0x2C, 0xE3, 0x29, 0x92, 0x0B, 0x13, 0x26, 0xE6, 0x9E, 0x83, 0x13, 0x 65, 0xA4, 0x76, 0xD6, 0x55, 0x15, 0xDB, 0x37, 0xDE, 0x7D, 0x39, 0xD9, 0xBA, 0x35, 0xA5, 0x6F, 0xCA, 0xC5, 0x5F, 0xD7, 0xD1, 0x79, 0x08, 0x27, 0xD2, 0x54, 0x4E, 0xDC, 0x58, 0x14, 0xC1, 0x86, 0xBD, 0x1E, 0x59, 0xFA, 0x63, 0x0E, 0xB6, 0x67, 0xC4, 0x56, 0x0F, 0x03, 0xC1, 0x11, 0xE4, 0x37, 0x8C, 0xA8, 0x71, 0x79, 0x4E, 0x48, 0xA1, 0x30, 0xE3, 0x64, 0x2B, 0x4C, 0x7B, 0x67, 0xC8, 0x81, 0xF1, 0x87, 0x6C, 0x24, 0x4E, 0xA4, 0xAF, 0x40, 0xD5, 0xCA, 0xA3, 0x3B, 0x2C, 0x17, 0x9E, 0xE D, 0xB7, 0x51, 0x74, 0xC0, 0x22, 0x8A, 0x49, 0x0E, 0xA5, 0xB6, 0x6A, 0xD7, 0xCF, 0x49, 0x4D, 0x 0A, 0xFF, 0x14, 0xD1, 0x45, 0xCC, 0xCC, 0x03, 0x99, 0xEC, 0xE7, 0x23, 0x72, 0x69, 0x1D, 0xD6, 0xB9, 0xA3, 0x60, 0x81, 0xB3, 0x6A, 0x07, 0xFF, 0xF2, 0x95, 0x8E, 0x61, 0xAE, 0x45, 0x44, 0x55, 0x B8, 0x47, 0xB5, 0xD7, 0x2A, 0x2C, 0x4D, 0xEC, 0xA6, 0xB3, 0x81, 0xE7, 0x9E, 0xE1, 0x1A, 0x1D, 0x1D, 0x74, 0x3F, 0xEA, 0x23, 0x75, 0x15, 0xC9, 0x17, 0x39, 0x26, 0x67, 0xD9, 0x82, 0x23, 0xDE, 0xC6, 0xF8, 0x4A, 0x32, 0x5F, 0x58, 0x35, 0x5E, 0x01, 0xDE, 0xC4, 0x9A, 0xDD, 0xBF, 0x2B, 0x29, 0xEC, 0xC8, 0x89, 0x08, 0xDB, 0x09, 0xF9, 0x9B, 0xE1, 0x89, 0x7C, 0x65, 0x66, 0x9B, 0xF0, 0xA9, 0xEE, 0x10, 0xE6, 0xCF, 0xCE, 0xA8, 0x00, 0xC2, 0xE4, 0xBF, 0xCB, 0xD5, 0x48, 0x20, 0xFD, 0xE 6, 0x13, 0x31, 0x00, 0xB0.

Step 106-3, the APPLE device authenticates the certificate in the certificate response data, performs step 106-4 if the authentication is successful; reports error and ends the procedure if the authentication fails.

Specifically, in the embodiment, the step 106-3 includes: the APPLE device uses a stored public key to decrypt a signature value in the certificate to obtain a first decryption value, performs a hash operation on data to be signed in the certificate to obtain a first hash value, determines whether the first hash value is identical to the first decrypting value, if yes, the authentication of the certificate is successful, performs step 106-4; otherwise, the authentication fails, reports error and ends the procedure.

Step 106-4, the APPLE device generates a challenge value, generates a challenge instruction according to the challenge value and sends the challenge instruction to the external device.

For example, the challenge instruction in the embodiment is: 0xFF, 0x5A, 0x00, 0x28, 0x40, 0xE9, 0x1D, 0x01, 0x38, 0x40, 0x40, 0x00, 0x1E, 0xAA, 0x02, 0x00, 0x18, 0x00, 0x00, 0xDF, 0x5B, 0x69, 0xEE, 0x43, 0xF7, 0x14, 0xA4, 0x70, 0x6E, 0x60, 0xCF, 0xD6, 0x04, 0x52, 0x1F, 0x07, 0x5C, 0xCC, 0xD7, 0xBD.

Step 106-5, the external device receives the challenge instruction via the USB interface, parses the challenge instruction and sends the challenge value obtained by parsing to the internal authentication chip, reads a challenge value signature result from the internal authentication chip, generates challenge response data according to the challenge value signature result and stores the challenge response data in the send cache, and returns the challenge response data in the send cache to the APPLE device via the USB interface.

For example, the read challenge response data in the embodiment is: 0xFF, 0x5A, 0x00, 0x94, 0x40, 0x1E, 0xE9, 0x01, 0xCB, 0x40, 0x40, 0x00, 0x8A, 0xAA, 0x03, 0x00, 0x84, 0x00, 0x00, 0x00, 0xE5, 0xA8, 0x3D, 0xB7, 0x1B, 0xE3, 0x66, 0xE4, 0xDE, 0xA4, 0x5E, 0xD4, 0x33, 0xE5, 0x4E, 0x7B, 0x90, 0x6E, 0xE3, 0x9B, 0x33, 0x93, 0x4A, 0x14, 0xCA, 0xF3, 0xA7, 0xD 3, 0x6B, 0xDE, 0x1E, 0x0E, 0x14, 0x66, 0x37, 0x68, 0x72, 0xD1, 0x76, 0x7D, 0x36, 0xDC, 0x9D, 0x4 4, 0x88, 0x3D, 0x55, 0xAD, 0x3D, 0xCD, 0xCE, 0x84, 0xC2, 0x50, 0xCF, 0x5E, 0x81, 0xCB, 0xA6, 0xBB, 0xB0, 0x78, 0x64, 0xCE, 0x91, 0x99, 0xD3, 0xD0, 0x23, 0x48, 0x67, 0xA5, 0xD4, 0x00, 0x6B, 0x07, 0x7A, 0x6B, 0xFE, 0x7E, 0xA7, 0x17, 0xEB, 0x36, 0xF3, 0x56, 0xC7, 0x35, 0x46, 0x5D, 0xF6, 0x46, 0x96, 0x72, 0xC3, 0x28, 0xF5, 0x16, 0xC3, 0x95, 0x55, 0x96, 0x00, 0xC9, 0x5D, 0xAF, 0x09, 0x F0, 0x69, 0x7A, 0xC5, 0xF9, 0xBB, 0x10, 0x4E, 0xB4, 0x00, 0xE8, 0xED, 0x16, 0x77, 0xBE, 0xCC, 0xDF, 0x99, 0x61, 0x65, 0xDB.

Step 106-6, the APPLE device authenticates the challenge value signature result in the challenge response data, performs step 106-7 if the authentication is successful, reports error and ends the procedure if the authentication fails.

Specifically, in the embodiment, the step 106-6 includes: the APPLE device uses a stored public key to decrypt the challenge value signature result in the challenge response data to obtain a second decryption value, performs a hash operation on the challenge value in the challenge response data to obtain a second hash value, determines whether the second decrypting value is identical to the second hash value, if yes, the authentication is successful, performs step 106-7; otherwise, the authentication fails, reports error and ends the procedure.

Step 106-7, the APPLE device sends authentication success information to the external device.

For example, the authentication success information in the embodiment is: 0xFF, 0x5A, 0x00, 0x10, 0x40, 0xEA, 0x1E, 0x01, 0x4E, 0x40, 0x40, 0x00, 0x06, 0xAA, 0x05, 0xCB.

Step 107, the APPLE device sends a device authentication instruction to the external device.

For example, the device authentication instruction in the embodiment is: 0xFF, 0x5A, 0x00, 0x10, 0x40, 0x57, 0xDC, 0x01, 0x23, 0x40, 0x40, 0x00, 0x06, 0x1D, 0x00, 0x5D.

Step 108, the external device receives the device authentication instruction via the USB interface, organizes an authentication response and stores the authentication response in the send cache, returns the authentication response in the send cache to the APPLE device via the USB interface.

For example, the identification response returned to the APPLE device in the embodiment is: 0xFF, 0x5A, 0x01, 0x10, 0x40, 0xDD, 0x57, 0x01, 0x21, 0x40, 0x40, 0x01, 0x06, 0x1D, 0x01, 0x00, 0x10, 0x00, 0x00, 0x69, 0x65, 0x50, 0x61, 0x73, 0x73, 0x46, 0x49, 0x44, 0x4F, 0x3 2, 0x00, 0x00, 0x10, 0x00, 0x01, 0x69, 0x65, 0x50, 0x61, 0x73, 0x73, 0x46, 0x49, 0x44, 0x4F, 0x32, 0x00, 0x00, 0x0C, 0x00, 0x02, 0x46, 0x65, 0x69, 0x74, 0x69, 0x61, 0x6E, 0x00, 0x00, 0x15, 0x00, 0x03, 0x30, 0x30, 0x30, 0x30, 0x30, 0x30, 0x30, 0x30, 0x30, 0x30, 0x30, 0x30, 0x30, 0x30, 0x30, 0x0 0, 0x00, 0x0A, 0x00, 0x04, 0x31, 0x2E, 0x30, 0x2E, 0x30, 0x00, 0x00, 0x0A, 0x00, 0x05, 0x31, 0x2E, 0x30, 0x2E, 0x30, 0x00, 0x00, 0x0A, 0x00, 0x06, 0x68, 0x00, 0x68, 0x02, 0x68, 0x03, 0x00, 0x0A, 0x0x 00, 0x07, 0xEA, 0x00, 0xEA, 0x01, 0x68, 0x01, 0x00, 0x05, 0x00, 0x08, 0x00, 0x00, 0x06, 0x00, 0x09, 0x00, 0x32, 0x00, 0x29, 0x00, 0x0A, 0x00, 0x05, 0x00, 0x00, 0x00, 0x00, 0x1B, 0x00, 0x01, 0x63, 0x0x 6F, 0x6D, 0x2E, 0x66, 0x74, 0x73, 0x61, 0x66, 0x65, 0x2E, 0x69, 0x65, 0x50, 0x61, 0x73, 0x73, 0x46, 0x49, 0x44, 0x4F, 0x32, 0x00, 0x00, 0x05, 0x00, 0x02, 0x01, 0x00, 0x0F, 0x00, 0x0B, 0x53, 0x34, 0x3 7, 0x54, 0x34, 0x55, 0x45, 0x53, 0x50, 0x33, 0x00, 0x00, 0x07, 0x00, 0x0C, 0x65, 0x6E, 0x00, 0x00, 0x07, 0x00, 0x0D, 0x65, 0x6E, 0x00, 0x00, 0x26, 0x00, 0x10, 0x00, 0x06, 0x00, 0x00, 0x00, 0x00, 0x0 0, 0x18, 0x00, 0x01, 0x4C, 0x69, 0x67, 0x68, 0x74, 0x6E, 0x69, 0x6E, 0x67, 0x20, 0x43, 0x6F, 0x6E, 0x6E, 0x65, 0x63, 0x74, 0x6F, 0x72, 0x00, 0x00, 0x04, 0x00, 0x02, 0x00, 0x20, 0x00, 0x12, 0x00, 0x06, 0x00, 0x00, 0x00, 0x01, 0x00, 0x11, 0x00, 0x01, 0x55, 0x73, 0x62, 0x20, 0x4B, 0x65, 0x79, 0x62, 0x6F, 0x61, 0x72, 0x64, 0x00, 0x00, 0x05, 0x00, 0x02, 0x00, 0xA4.

Step 109, the APPLE device prompts a user to press a key on the external device.

Step 110, in a case that the user pressing a key is detected, the external device generates key-value data, organizes a start command according to a preset HID identifier and stores the start command in the send cache, and sets a sending identifier as a first preset value.

The start command in the embodiment is used for declaring that the external device is a keyboard device; and the present HID identifier includes: a HID identification code and a HID report descriptor.

For example, the external device in the embodiment is OTP, the generating key-value data specifically is: generating a dynamic password according to seed data and/or a dynamic factor and taking the dynamic password as the key-value data.

Step 111, in a case that the external device receives the data request sent by the APPLE device via the USB interface, the external device determines whether the sending identifier is the first preset value, if yes, the external device sends the start command in the send cache to the APPLE device via the USB interface and clears the send cache, waits for receiving the data request continuously sent by the APPLE device; in a case that the external device detects that the send cache is cleared, the external device generates an attaching report command according to the key-value data and stores the attaching report command in the send cache, sets the sending identifier as a second preset value, and performs step 112; otherwise, the external device returns response data to the APPLE device via the USB interface.

In the embodiment, the generating an attaching report command according to the key-value data and stores the attaching report command in the send cache in the step 111 specifically is: converting the key-value data into key-pressing information, generating an attaching report command according to the key-pressing information and storing the attaching report command into the send cache.

For example, the start command in the embodiment is: 0xFF, 0x5A, 0x00, 0x65, 0x40, 0x41, 0xE9, 0x0A, 0xCE, 0x40, 0x40, 0x00, 0x5B, 0x68, 0x00, 0x00, 0x06, 0x00, 0x00, 0x00, 0x01, 0x00, 0x06, 0x00, 0x01, 0x10, 0x50, 0x00, 0x06, 0x00, 0x02, 0x04, 0x20, 0x00, 0x43, 0x00, 0x04, 0x05, 0x01, 0x09, 0x06, 0xA1, 0x01, 0x05, 0x07, 0x19, 0xE0, 0x29, 0xE7, 0x15, 0x00, 0x25, 0x01, 0x75, 0x01, 0x95, 0x08, 0x81, 0x02, 0x95, 0x01, 0x75, 0x08, 0x81, 0x01, 0x95, 0x05, 0x75, 0x01, 0x05, 0x08, 0x19, 0x01, 0x29, 0x05, 0x91, 0x02, 0x95, 0x01, 0x75, 0x03, 0x91, 0x01, 0x95, 0x06, 0x75, 0x08, 0x15, 0x00, 0x25, 0x65, 0x05, 0x07, 0x19, 0x00, 0x29, 0x65, 0x81, 0x00, 0xC0, 0x67.

Step 112, the APPLE device exits a soft keyboard after receiving the start command, and the APPLE device continuously sends the data request to the external device.

Step 113, in a case that the external device receives the data request sent by the APPLE device via the USB interface, the external device determines whether the sending identifier is a second preset value, if yes, the external device sends the attaching report command in the send cache to the APPLE device via the USB interface and clears the send cache, waits for receiving the data request continuously sent by the APPLE device; in a case that the external device detects that the send cache is cleared, the external device organizes an end command and stores the end command in the send cache, sets the sending identifier as a third preset value, and performs step 114; otherwise, the external device returns response data to the APPLE device via the USB interface.

In the embodiment, the converting the key-value data into key-pressing information specifically is: converting key-value data, i.e. 1, 2, 3, 4, 5, 6, 7, 8, 9, 0 into key-pressing information, i.e. 0x1E, 0x1F, 0x20, 0x21, 0x22, 0x23, 0x24, 0x25, 0x26, 0x27 correspondingly. In addition, according to a USB keyboard protocol, key-lifting information corresponding to key-pressing information is 0x00. The USB interface of the external device sends the key-pressing information and the key-lifting information to the APPLE device in packet; only after receiving the key-pressing information and the key-lifting information, the APPLE device can identify a complete key-pressing process and display the key-pressing information accordingly. The packet format of the key-pressing information and the key-lifting information is Modifier key|Reserved|Keycode1|Keycode2|Keycode3|Keycode4|Keycode5|Keycode6|; and the packet format may have any number of key-pressing information from 1 to 6. The external device sends the data packet of the key-pressing information to the APPLE device via the USB interface, which is to send a data packet containing one key-pressing information to the APPLE device many times, or to send a data packet containing multiple key-pressing information to the APPLE device at one time or many times. The position of the key-pressing information in the attaching report command is from the second bit to the ninth bit from the lower order.

For example, the key-value data in the embodiment is 123456, and 6 bits key-value data are respectively converted into key-pressing information according to the USB keyboard protocol:

the key-value data 1 corresponds to key-pressing information 0x1E, the corresponding data packet is: 0x00, 0x00, 0x1E, 0x00, 0x00, 0x00, 0x00, 0x00;
the key-value data 2 corresponds to key-pressing information 0x1F, the corresponding data packet is: 0x00, 0x00, 0x1F, 0x00, 0x00, 0x00, 0x00, 0x00;
the key-value data 3 corresponds to key-pressing information 0x20, the corresponding data packet is: 0x00, 0x00, 0x20, 0x00, 0x00, 0x00, 0x00, 0x00;
the key-value data 4 corresponds to key-pressing information 0x21, the corresponding data packet is: 0x00, 0x00, 0x21, 0x00, 0x00, 0x00, 0x00, 0x00;
the key-value data 5 corresponds to key-pressing information 0x22, the corresponding data packet is: 0x00, 0x00, 0x22, 0x00, 0x00, 0x00, 0x00, 0x00;
the key-value data 6 corresponds to key-pressing information 0x23, the corresponding data packet is: 0x00, 0x00, 0x23, 0x00, 0x00, 0x00, 0x00, 0x00.

The key-lifting information is 0x00, and the data packet is: 0x00, 0x00, 0x00, 0x00, 0x00, 0x00, 0x00, 0x00.

The generated 12 pieces of attaching report command are:

0xFF, 0x5A, 0x00, 0x22, 0x40, 0x2B, 0xD8, 0x01, 0x41, 0x40, 0x40, 0x00, 0x18, 0x68, 0x 02, 0x00, 0x06, 0x00, 0x00, 0x00, 0x01, 0x00, 0x0C, 0x00, 0x01, 0x00, 0x00, 0x1E, 0x00, 0x00, 0x00, 0x00, 0x00, 0xCC;

0xFF, 0x5A, 0x00, 0x22, 0x40, 0x2C, 0xD8, 0x01, 0x40, 0x40, 0x40, 0x00, 0x18, 0x68, 0x 02, 0x00, 0x06, 0x00, 0x00, 0x00, 0x01, 0x00, 0x0C, 0x00, 0x01, 0x00, 0x00, 0x00, 0x00, 0x00, 0x00, 0x00, 0x00, 0xEA;

0xFF, 0x5A, 0x00, 0x22, 0x40, 0x2D, 0xD8, 0x01, 0x3F, 0x40, 0x40, 0x00, 0x18, 0x68, 0x 02, 0x00, 0x06, 0x00, 0x00, 0x00, 0x01, 0x00, 0x0C, 0x00, 0x01, 0x00, 0x00, 0x1F, 0x00, 0x00, 0x00, 0x00, 0x00, 0xCB;

0xFF, 0x5A, 0x00, 0x22, 0x40, 0x2E, 0xD8, 0x01, 0x3E, 0x40, 0x40, 0x00, 0x18, 0x68, 0x 02, 0x00, 0x06, 0x00, 0x00, 0x00, 0x01, 0x00, 0x0C, 0x00, 0x01, 0x00, 0x00, 0x00, 0x00, 0x00, 0x00, 0x00, 0x00, 0xEA;

0xFF, 0x5A, 0x00, 0x22, 0x40, 0x2F, 0xD8, 0x01, 0x3D, 0x40, 0x40, 0x00, 0x18, 0x68, 0x 02, 0x00, 0x06, 0x00, 0x00, 0x00, 0x01, 0x00, 0x0C, 0x00, 0x01, 0x00, 0x00, 0x20, 0x00, 0x00, 0x00, 0x00, 0x00, 0xCA;

0xFF, 0x5A, 0x00, 0x22, 0x40, 0x30, 0xD8, 0x01, 0x3C, 0x40, 0x40, 0x00, 0x18, 0x68, 0x 02, 0x00, 0x06, 0x00, 0x00, 0x00, 0x01, 0x00, 0x0C, 0x00, 0x01, 0x00, 0x00, 0x00, 0x00, 0x00, 0x00, 0x00, 0x00, 0xEA;

0xFF, 0x5A, 0x00, 0x22, 0x40, 0x31, 0xD8, 0x01, 0x3B, 0x40, 0x40, 0x00, 0x18, 0x68, 0x 02, 0x00, 0x06, 0x00, 0x00, 0x00, 0x01, 0x00, 0x0C, 0x00, 0x01, 0x00, 0x00, 0x21, 0x00, 0x00, 0x00, 0x00, 0x00, 0xC9;

0xFF, 0x5A, 0x00, 0x22, 0x40, 0x32, 0xD8, 0x01, 0x3A, 0x40, 0x40, 0x00, 0x18, 0x68, 0x 02, 0x00, 0x06, 0x00, 0x00, 0x00, 0x01, 0x00, 0x0C, 0x00, 0x01, 0x00, 0x00, 0x00, 0x00, 0x00, 0x00, 0x00, 0x00, 0xEA;

0xFF, 0x5A, 0x00, 0x22, 0x40, 0x33, 0xD8, 0x01, 0x39, 0x40, 0x40, 0x00, 0x18, 0x68, 0x 02, 0x00, 0x06, 0x00, 0x00, 0x00, 0x01, 0x00, 0x0C, 0x00, 0x01, 0x00, 0x00, 0x22, 0x00, 0x00, 0x00, 0x00, 0x00, 0xC8;

0xFF, 0x5A, 0x00, 0x22, 0x40, 0x34, 0xD8, 0x01, 0x38, 0x40, 0x40, 0x00, 0x18, 0x68, 0x 02, 0x00, 0x06, 0x00, 0x00, 0x00, 0x01, 0x00, 0x0C, 0x00, 0x01, 0x00, 0x00, 0x00, 0x00, 0x00, 0x00, 0x00, 0x00, 0xEA;

0xFF, 0x5A, 0x00, 0x22, 0x40, 0x35, 0xD8, 0x01, 0x37, 0x40, 0x40, 0x00, 0x18, 0x68, 0x 02, 0x00, 0x06, 0x00, 0x00, 0x00, 0x01, 0x00, 0x0C, 0x00, 0x01, 0x00, 0x00, 0x23, 0x00, 0x00, 0x00, 0x00, 0x00, 0xC7;

0xFF, 0x5A, 0x00, 0x22, 0x40, 0x36, 0xD8, 0x01, 0x36, 0x40, 0x40, 0x00, 0x18, 0x68, 0x 02, 0x00, 0x06, 0x00, 0x00, 0x00, 0x01, 0x00, 0x0C, 0x00, 0x01, 0x00, 0x00, 0x00, 0x00, 0x00, 0x00, 0x00, 0x00, 0xEA.

In the embodiment, in a case that the USB interface of the external device sends one press key information every time, the specific process of sending the key-pressing information to the APPLE device is: the USB interface of the external device sends the key-pressing information of key 1 (0xFF, 0x5A, 0x00, 0x22, 0x40, 0x2B, 0xD8, 0x01, 0x41, 0x40, 0x40, 0x00, 0x18, 0x68, 0x02, 0x00, 0x06, 0x00, 0x00, 0x00, 0x01, 0x00, 0x0C, 0x00, 0x01, 0x00, 0x00, 0x1E, 0x00, 0x00, 0x00, 0x00, 0x00, 0xCC) and the key-lifting information of key 1 (0xFF, 0x5A, 0x00, 0x22, 0x40, 0x2C, 0xD8, 0x01, 0x40, 0x40, 0x40, 0x00, 0x18, 0x68, 0x02, 0x00, 0x06, 0x00, 0x00, 0x00, 0x01, 0x00, 0x0C, 0x00, 0x01, 0x00, 0x00, 0x00, 0x00, 0x00, 0x00, 0x00, 0x00, 0xEA) to the APPLE device in packet; the APPLE device identifies key 1 and continuously sends a data request to the external device; in a case that the USB interface of the external device receives the data request, the USB interface of the external device sends the key-pressing information of key 2 (0xFF, 0x5A, 0x00, 0x22, 0x40, 0x2F, 0xD8, 0x01, 0x3D, 0x40, 0x40, 0x00, 0x18, 0x68, 0x02, 0x00, 0x06, 0x00, 0x00, 0x00, 0x01, 0x00, 0x0C, 0x00, 0x01, 0x00, 0x00, 0x20, 0x00, 0x00, 0x00, 0x00, 0x00, 0xCA) and the key-lifting information of key 2 (0xFF, 0x5A, 0x00, 0x22, 0x40, 0x2E, 0xD8, 0x0l, 0x3E, 0x40, 0x40, 0x00, 0x18, 0x68, 0x02, 0x00, 0x06, 0x00, 0x00, 0x00, 0x01, 0x00, 0x0C, 0x00, 0x01, 0x00, 0x00, 0x00, 0x00, 0x00, 0x00, 0x00, 0xEA) to the APPLE device in packet, the APPLE device identifies key 2. In this way, the external device sends subsequent keys 3, 4, 5, 6 to the APPLE device successively, and the APPLE device finally identifies the complete key-pressing information 123456. Since the sending speed is very fast, the user can see complete key-pressing information 123456.

In a case that the USB interface of the external device sends 2 key-pressing information every time, the specific process of sending the key-pressing information to the APPLE device is: the USB interface of the external device sends the key-pressing information of key 1 and key 2 (0xFF, 0x5A, 0x00, 0x22, 0x40, 0x2B, 0xD8, 0x01, 0x41, 0x40, 0x40, 0x00, 0x18, 0x68, 0x02, 0x00, 0x06, 0x00, 0x00, 0x00, 0x01, 0x00, 0x0C, 0x00, 0x01, 0x00, 0x00, 0x1E, 0x1F, 0x00, 0x00, 0x00, 0x00, 0xCC) and the key-lifting information of key 1 and key 2 (0xFF, 0x5A, 0x00, 0x22, 0x40, 0x2C, 0xD8, 0x01, 0x40, 0x40, 0x40, 0x00, 0x18, 0x68, 0x02, 0x00, 0x06, 0x00, 0x00, 0x00, 0x01, 0x00, 0x0C, 0x00, 0x01, 0x00, 0x00, 0x00, 0x00, 0x00, 0x00, 0x00, 0x00, 0xEA) to the APPLE device in packet, the APPLE device identifies key 1 and key 2 and continuously sends a data request to the external device. In a case that the USB interface of the external device receives the data request, the USB interface of the external device sends the key-pressing information of the key 3 and key 4 (0xFF, 0x5A, 0x00, 0x22, 0x40, 0x2F, 0xD8, 0x01, 0x3D, 0x40, 0x40, 0x00, 0x18, 0x68, 0x02, 0x00, 0x06, 0x00, 0x00, 0x00, 0x01, 0x00, 0x0C, 0x00, 0x01, 0x00, 0x00, 0x20, 0x21, 0x00, 0x00, 0x00, 0x00, 0xCA) and the key-lifting information of key 3 and key 4 (0xFF, 0x5A, 0x00, 0x22, 0x40, 0x2E, 0xD8, 0x01, 0x3E, 0x40, 0x40, 0x00, 0x18, 0x68, 0x02, 0x00, 0x06, 0x00, 0x00, 0x00, 0x01, 0x00, 0x0C, 0x00, 0x01, 0x00, 0x00, 0x00, 0x00, 0x00, 0x00, 0x00, 0xEA) to the APPLE device in packet, and the APPLE device identifies key 3 and key 4. In this way, the external device sends subsequent keys 5 and 6 to the APPLE device successively. The APPLE device finally identifies the complete key-pressing information 123456.

In a case that the USB interface of the external device sends 6 key-pressing information every time, the specific process of sending the key-pressing information to the APPLE device is: the USB interface of the external device sends the key-pressing information of keys 1, 2, 3, 4, 5 and 6 (0xFF, 0x5A, 0x00, 0x22, 0x40, 0x2B, 0xD8, 0x01, 0x41, 0x40, 0x40, 0x00, 0x18, 0x68, 0x02, 0x00, 0x06, 0x00, 0x00, 0x00, 0x01, 0x00, 0x0C, 0x00, 0x01, 0x00, 0x00, 0x1E, 0x1F, 0x20, 0x21, 0x22, 0x23, 0xCC) and the key-lifting information of keys 1, 2, 3, 4, 5 and 6 (0xFF, 0x5A, 0x00, 0x22, 0x40, 0x2C, 0xD8, 0x01, 0x40, 0x40, 0x40, 0x00, 0x18, 0x68, 0x02, 0x00, 0x06, 0x00, 0x00, 0x00, 0x01, 0x00, 0x0C, 0x00, 0x01, 0x00, 0x00, 0x00, 0x00, 0x00, 0x00, 0x00, 0x00, 0xEA) to the APPLE device in packet; and the APPLE device identifies keys 1, 2, 3, 4, 5 and 6. The APPLE device identifies the complete key-pressing information 123456.

Step 114, the APPLE device displays the key-value data in the attaching report command after receiving the attaching report command, and the APPLE device continuously sends the data request to the external device.

Step 115, in a case that the external device receives the data request sent by the APPLE device via the USB interface, the external device determines whether the sending identifier is a third preset value, if yes, the external device sends the end command in the send cache to the APPLE device via the USB interface and clears the send cache and the sending identifier, waits for receiving the data request sent by the APPLE device, and performs step 116; otherwise, the external device returns response data to the APPLE device via the USB interface.

Step 116, the APPLE device pops up the soft keyboard again after receiving the end command.

For example, the end command in the embodiment is: 0xFF, 0x5A, 0x00, 0x16, 0x40, 0x9C, 0xE9, 0x0A, 0xC2, 0x40, 0x40, 0x00, 0x0C, 0x68, 0x03, 0x00, 0x06, 0x00, 0x00, 0x00, 0x01, 0x02.

Optionally, the external device in the embodiment may be a device with an OTP function.

In the embodiment, the step 109 may be replaced with: an application browser of the APPLE device prompts the user to input key-value data.

Correspondingly, in the step 113, the APPLE device displays the key-value data in the attaching report command after receiving the attaching report command may be replaced with: the APPLE device sends the key-value data in the attaching report command to the browser after receiving the attaching report command, and the browser performs corresponding operation after receiving the key-value data.

Specifically, the browser performs corresponding operation after receiving the key-value data may be: the browser authenticates the identity of the user according to the key-value data, that is, the browser parses the key-value data to obtain a dynamic password and generates a dynamic password, determines whether the obtained dynamic password is identical to the generated dynamic password, if yes, the authentication is successful; otherwise, the authentication fails.

In the embodiment, in a case that the external device does not detect the sending identifier (or the sending identifier is a default value) when the external device receives the data request sent by the APPLE device, the external device sends response data to the APPLE device via the USB interface.

A function that an external device simulates a keyboard is dynamically implemented through the method of the embodiment, which reduces the conflict between the keyboard simulated by the external device and the soft keyboard of the APPLE device, and reduces the burden of the APPLE device. At the same time, the external device may also have other functions, such as an authenticator, a USB flash disk, etc., which is convenient for using by the user.

Embodiment 4

Figure 4:
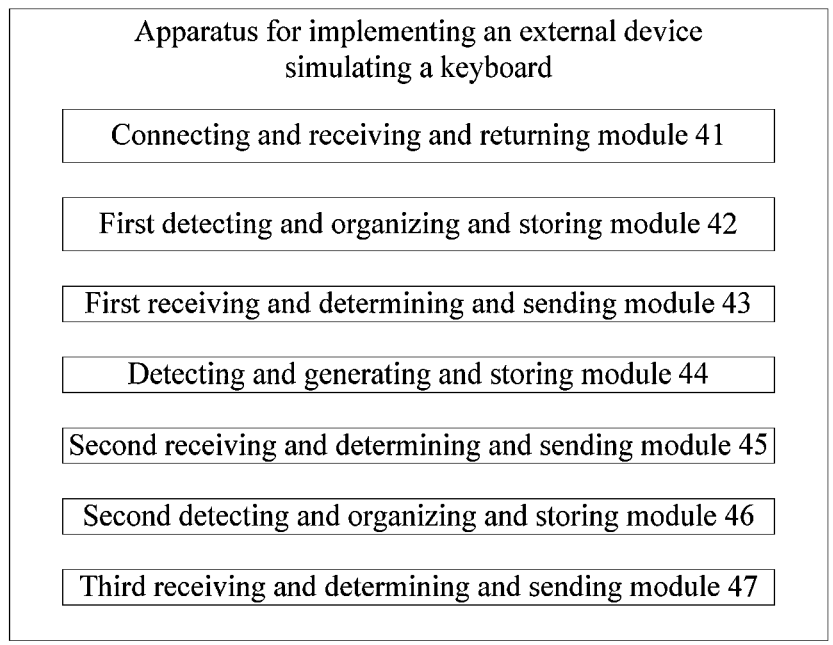
FIG. 4 is a block diagram of an apparatus for implementing an external device simulating a keyboard according to Embodiment 4 of the present disclosure.

Embodiment 4 of the present disclosure provides an apparatus for implementing an external device simulating a keyboard; the apparatus of the embodiment connects with an APPLE device to work. As shown in FIG. 4, the apparatus of the embodiment includes:

a connecting and receiving and returning module 41, configured to implement a connection between the apparatus and the APPLE device, wait for receiving a data request continuously sent by the APPLE device, return response data to the APPLE device via a USB interface in a case that the apparatus receives the data request sent by the APPLE device via the USB interface and there is no data in a send cache of the apparatus;

a first detecting and organizing and storing module 42, configured to: in a case that a user pressing a key is detected in a process that the connecting and receiving and returning module 41 is waiting for receiving the data request continuously sent by the APPLE device, generate key-value data, organize a start command according to a preset HID identifier and store the start command in the send cache, and set a sending identifier as a first preset value; where the start command is used for declaring that the apparatus is a keyboard device; In the embodiment, the start command is used for declaring that the external device is a keyboard device; and the preset HID identifier includes a HID identification code and a HID report descriptor;

a first receiving and determining and sending module 43, configured to: in a case that the data request sent by the APPLE device is received via the USB, determine whether the sending identifier is the first preset value; if yes, send the start command in the send cache to the APPLE device via the USB interface and clear the send cache, wait for receiving the data request continuously sent by the APPLE device, and trigger a detecting and generating and storing module 44; otherwise, return response data to the APPLE device via the USB interface;

the detecting and generating and storing module 44, configured to: in a case that the send cache being cleared is detected, generate an attaching report command according to the key-value data and store the attaching report command in the send cache, and set the sending identifier as a second preset value; in the embodiment, the detecting and generating and storing module 44 is specifically configured to: in a case that the send cache being cleared is detected, convert the key-value data into key-pressing information, generate an attaching report command according to the key-pressing information and store the attaching report command in the send cache;

a second receiving and determining and sending module 45, configured to: in a case that the data request sent by the APPLE device is received via the USB interface, determine whether the sending identifier is the second preset value; if yes, send the attaching report command in the send cache to the APPLE device via the USB interface and clear the send cache, wait for receiving the data request continuously sent by the APPLE device, and trigger a second detecting and organizing and storing module 46; otherwise, return response data to the APPLE device via the USB interface;

the second detecting and organizing and storing module 46, configured to: in a case that the send cache being cleared is detected, organize an end command and store the end command in the send cache, and set the sending identifier as a third preset value; and a third receiving and determining and sending module 47, configured to: in a case that the data request sent by the APPLE device is received via the USB interface, determine whether the sending identifier is the third preset value; if yes, send the end command in the send cache to the APPLE device via the USB interface and clear the send cache and the sending identifier, wait for receiving the data request continuously sent by the APPLE device; otherwise, return response data to the APPLE device via the USB interface.

Further, the connecting and receiving and returning module 41 is specifically configured to: perform hardware system initialization after establishing a physical connection with the APPLE device via a LIGHTNING interface; receive the data request continuously sent by the APPLE device, and return response data to the APPLE device via the USB interface in a case that the data request sent by the APPLE device is received via the USB interface and there is no data in the send cache.

The connecting and receiving and returning module 41 in the embodiment is further configured to store a detecting instruction in the send cache;

correspondingly, the apparatus of the embodiment further includes:

a fourth receiving and determining and sending module, configured to: in a case that the data request sent by the APPLE device is received via the USB interface, determine whether there is data in the send cache; if yes, send the detecting instruction in the send cache to the APPLE device via the USB interface and receive support authentication protocol information sent by the APPLE device, negotiate synchronization packet data with the APPLE device; otherwise, return response data to the APPLE device via the USB interface; and a receiving and organizing and sending module, configured to: in a case that authentication success information and a device authentication instruction sent by the APPLE device are received via the USB interface, organize an authentication response and store the authentication response in the send cache, and return the authentication response in the send cache to the APPLE device via the USB interface.

Optionally, the apparatus in the embodiment further includes:

a receiving and reading and sending module, configured to: in a case that a certificate acquisition instruction sent by the APPLE device is received via the USB interface, read a certificate from an internal authentication chip and store the certificate in the send cache, and return the certificate in the send cache to the APPLE device via the USB interface; and a parsing and reading and sending module, configured to: in a case that a challenge instruction sent by the APPLE device is received via the USB interface, parse the challenge instruction and send a challenge value obtained by parsing to the internal authentication chip, read a challenge value signature result from the internal authentication chip and store the challenge value signature result in the send cache, and return the challenge value signature result in the send cache to the APPLE device via the USB interface.

Further, the detecting and generating and storing module 44 in the embodiment is specifically configured to: in a case that the send cache being cleared is detected, convert the key-value data into key-pressing information, generate an attaching report command according to the key-pressing information and store the attaching report command in the send cache.

Embodiment 5

Figure 5:
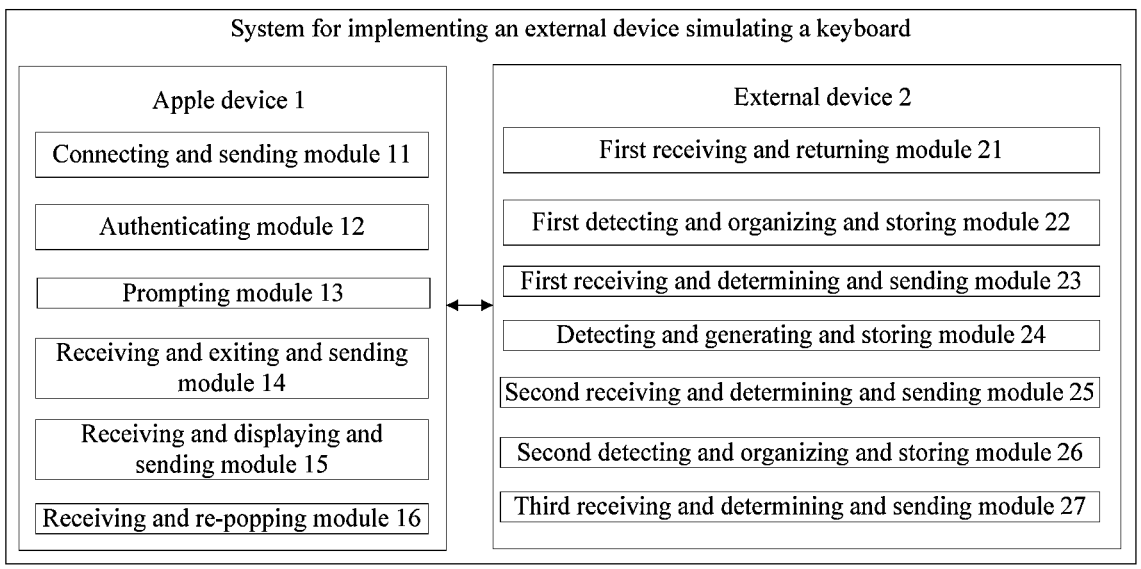
FIG. 5 is a schematic diagram of a system for implementing an external device simulating a keyboard according to Embodiment 5 of the present disclosure.

Embodiment 5 of the present disclosure provides a system for implementing an external device simulating a keyboard. As shown in FIG. 5, the system includes an APPLE device 1 and an external device 2; the APPLE device 1 includes: a connecting and sending module 11, an authenticating module 12, a prompting module 13, a receiving and exiting and sending module 14, a receiving and displaying and sending module 15 and a receiving and re-popping module 16; the external device 2 includes: a first receiving and returning module 21, a first detecting and organizing and storing module 22, a first receiving and determining and sending module 23, a detecting and generating and storing module 24, a second receiving and determining and sending module 25, a second detecting and organizing and storing module 26 and a third receiving and determining and sending module 27;

the first receiving and returning module 21 is configured to return response data to the APPLE device 1 via a USB interface in a case that the data request sent by the APPLE device 1 is received via the USB interface and there is no data in the send cache;

the first receiving and returning module 21 is configured to return response data to the APPLE device 1 via a USB interface in a case that the external device 2 receives the data request sent by the APPLE device 1 via the USB interface and there is no data in the send cache;

the authenticating module 12 is configured to authenticate the external device 2; trigger the prompting module in a case that the authentication is successful; otherwise, report error and end the procedure;

the prompting module 13 is configured to prompt a user to press a key on the external device 2;

the first detecting and organizing and storing module 22 is configured to: in a case that the user pressing a key is detected, generate key-value data, organize a start command according to a preset HID identifier and store the start command in the send cache, set a sending identifier as a first preset value, and trigger the first receiving and determining and sending module 23; in the embodiment, the start command is used for declaring that the external device 2 is a keyboard device; the preset HID identifier includes a HID identification code and a HID report descriptor;

the first receiving and determining and sending module 23 is configured to: in a case that the data request sent by the APPLE device 1 is received via the USB interface, determine whether the sending identifier is the first preset value, if yes, send the start command in the send cache to the APPLE device 1 via the USB interface and clear the send cache, wait for receiving the data request continuously sent by the APPLE device 1, and trigger the detecting and generating and storing module 24; otherwise, return response data to the APPLE device 1 via the USB interface;

the detecting and generating and storing module 24 is configured to: in a case that the send cache being cleared is detected, generate an attaching report command according to the key-value data and store the attaching report command in the send cache, and set the sending identifier as a second preset value;

the receiving and exiting and sending module 14 is configured to exit a soft keyboard after receiving the start command, send the data request to the external device 2, and trigger the second receiving and determining and sending module 25;

the second receiving and determining and sending module 25 is configured to: in a case that the data request sent by the APPLE device 1 is received via the USB interface, determine whether the sending identifier is a second preset value, if yes, send the attaching report command in the send cache to the APPLE device 1 via the USB interface and clear the send cache, wait for receiving the data request continuously sent by the APPLE device 1, and trigger the second detecting and organizing and storing module 26; otherwise, return response data to the APPLE device 1 via the USB interface;

the second detecting and organizing and storing module 26 is configured to: in a case that the send cache being cleared is detected, organize an end command and store the end command in the send cache, and set the sending identifier as a third preset value;

the receiving and displaying and sending module 15 is configured to display the key-value data in the attaching report command after receiving the attaching report command, continuously send the data request to the external device 2, and trigger the third receiving and determining and sending module 27;

the third receiving and determining and sending module 27 is configured to: in a case that the data request sent by the APPLE device 1 is received via the USB interface, determine whether the sending identifier is a third preset value, if yes, send the end command in the send cache to the APPLE device 1 via the USB interface and clear the send cache and the sending identifier, wait for receiving the data request sent by the APPLE device 1; otherwise, return response data to the APPLE device 1 via the USB interface;

the receiving and re-popping module 16 is configured to pop up the soft keyboard again after receiving the end command.

In the embodiment, the APPLE device 1 further includes a detecting and returning module and a first sending module, the external device 2 further includes a receiving and negotiating module and a receiving and organizing and storing module;

the detecting and returning module is configured to detect whether it supports an authentication protocol, if yes, return supporting authentication protocol information to the external device 2, otherwise, report error and end the procedure;

the receiving and negotiating module is configured to negotiate synchronization packet data with the APPLE device 1 after receiving the authenticating protocol information via the USB interface;

the first sending module is configured to send a device authentication instruction to the external device 2 after the authenticating module 12 authenticates the external device 2 successfully;

the receiving and organizing and storing module is configured to: after receiving the device authentication instruction via the USB interface, organize an authentication response and store the authentication response in the send cache; return the authentication response in the send cache to the APPLE device 1 via the USB interface;

the prompting module is configured to prompt a user to press a key on the external device 2 in a case that the authentication response is received.

In the embodiment, the external device 2 further includes:

a first storing module, configured to store a detecting instruction in the send cache after the APPLE device 1 establishes a connection with the external device 2;

the detecting and returning module is specifically configured to: in a case that the data request sent by the APPLE device 1 is received via the USB interface, determine whether there is data in the send cache, if yes, send the detect instruction in the send cache to the APPLE device 1; otherwise, report error and end the procedure;

the APPLE device 1 further includes: a fourth receiving and determining and returning module, configured to: after receiving the detecting instruction, determine whether it supports the authentication protocol, if yes, return APPLE device 1 supporting authentication protocol information to the external device 2, and trigger the receiving and negotiating module; otherwise, report error and end the procedure.

Further, the fourth receiving and determining and returning module is specifically configured to: after receiving the detecting instruction, determine whether the protocol supported by itself includes the authentication protocol specified by the detecting instruction; if yes, return APPLE device 1 supporting authentication protocol information to the external device 2, and trigger the receiving and negotiating module; otherwise, report error and end the procedure.

Specifically, in the embodiment, the connecting and sending module 11 includes:

a connecting and initializing unit, configured to establishes a physical connection with the external device 2 via a LIGHTNING interface, where the external device 2 performs hardware system initialization; and an enumerating and sending unit, configured to perform USB enumerating, and continuously send a data request to the external device 2 after the USB enumeration is completed.

Specifically, in the embodiment, the authenticating module 12 includes: a first sending unit, a first receiving and authenticating unit, a generating and sending unit and a second receiving and authenticating unit; the external device 2 further includes: a receiving and reading and sending module and a parsing and reading and sending module;

the first sending unit is configured to send a certificate acquisition instruction to the external device 2;

the receiving and reading and sending module is configured to: in a case that the certificate acquisition instruction sent by the APPLE device 1 is received via the USB interface, read a certificate from an internal authentication chip and store the certificate in the send cache, and return the certificate in the send cache to the APPLE device 1 via the USB interface;

the first receiving and authenticating unit is configured to receive and authenticate the certificate; trigger the generating and sending unit in a case that the authentication is successful; and report error and end the procedure in a case that the authentication fails; further, the first receiving and authenticating unit is specifically configured to use a stored public key to decrypt a signature value in the certificate to obtain a first decrypting value, perform a hash operation on data to be signed in the certificate to obtain a first hash value, determine whether the first hash value is identical to the first decrypting value; if yes, the authentication is successful, trigger the generating and sending unit; otherwise, the authentication fails, report error and end the procedure;

the generating and sending unit is configured to generate a challenge value, generate a challenge instruction according to the challenge value and send the challenge instruction to the external device 2;

the parsing and reading and sending module is configured to: in a case that the challenge instruction sent by the APPLE device 1 is received via the USB interface, parse the challenge instruction and send the challenge value obtained by parsing to the internal authentication chip, read a challenge value signature result from the internal authentication chip and store the challenge value signature result in the send cache, and return the challenge value signature result in the send cache to the APPLE device 1 via the USB interface;

the second receiving and authenticating unit is configured to receive and authenticate the challenge value signature result, send authentication success information to the external device 2 in a case that the authentication is successful, report error and end the procedure in a case that the authentication fails; further, the second receiving and authenticating unit is specifically configured to receive the challenge value signature result, use a stored public key to decrypt the challenge value signature result to obtain a second decrypting value, perform a hash operation on the generated challenge value to obtain a second hash value, determine whether the second decrypting value is identical to the second hash value; if yes, the authentication is successful, send authentication success information to the external device 2; otherwise, the authenticating fails, report error and end the procedure.

Optionally, the prompting module 13 in the embodiment is further configured to prompt a user to input key-value data via an application browser of the APPLE device 1;

the receiving and displaying and sending module 15 is further configured to send the key-value data in the attaching report command to the browser after receiving the attaching report command; the browser performs corresponding operation after receiving the key-value data; the receiving and displaying and sending module is further configured to continue to send the data request to the external device 2.

Through the technical solutions of the embodiment in the present disclosure, when an external device is connected with an APPLE device, the external device can simulate a keyboard and an APPLE soft keyboard can be used normally as well, which reduces the conflict between the soft keyboard of the APPLE device and the keyboard simulated by the external device, and reduces the burden of the APPLE device, which is convenient for using by a user.

The above descriptions are only preferred specific embodiments of the present disclosure, but the protection scope of the present disclosure is not limited thereto. Any changes or substitutions that can be easily conceived by those skilled in the art within the technical scope of the present disclosure should be included in the protection scope of the present disclosure. Therefore, the protection scope of the present disclosure should be subject to the protection scope of the claims.

The invention claimed is:

1. A method for implementing an external device simulating a keyboard, comprising:
   step T1, establishing, by the external device, a physical connection with a first device, waiting for receiving a data request continuously sent by the first device, returning response data to the first device via a universal serial bus (USB) interface in a case that the external device receives the data request sent by the first device via the USB interface and there is no data in a send cache of the external device, and performing step T2 in a case that a user pressing a key is detected in a process that the external device is waiting for receiving the data request continuously sent by the first device, wherein the first device is a device using a mobile operating system;
   step T2, generating, by the external device, key-value data, organizing a start command according to a preset human interface device (HID) identifier and storing the start command in the send cache, and setting a sending identifier as a first preset value; wherein the start command is used for declaring that the external device is a keyboard device;
   step T3, in a case that the external device receives the data request sent by the first device via the USB interface, determining, by the external device, whether the sending identifier is the first preset value; if yes, sending the start command in the send cache to the first device via the USB interface and clearing the send cache, waiting for receiving the data request continuously sent by the first device, and performing step T4; otherwise, returning response data to the first device via the USB interface;
   step T4, in a case that the external device detects that the send cache is cleared, generating, according to the key-value data, an attaching report command and storing the attaching report command in the send cache, and setting the sending identifier as a second preset value;
   step T5, in a case that the external device receives the data request sent by the first device via the USB interface, determining, by the external device, whether the sending identifier is the second preset value; if yes, sending the attaching report command in the send cache to the first device via the USB interface and clearing the send cache, waiting for receiving the data request continuously sent by the first device, and performing step T6; otherwise, returning response data to the first device via the USB interface;
   step T6, in a case that the external device detects that the send cache is cleared, organizing an end command and storing the end command in the send cache, and setting the sending identifier as a third preset value; and
   step T7, in a case that the external device receives the data request sent by the first device via the USB interface, determining whether the sending identifier is the third preset value; if yes, sending the end command in the send cache to the first device via the USB interface and clearing the send cache and the sending identifier, waiting for receiving the data request continuously sent by the first device; otherwise, returning response data to the first device via the USB interface.

2. The method according to claim 1, wherein step T1 comprises: after the external device establishes the physical connection with the first device via a first interface, performing hardware system initialization; receiving the data request continuously sent by the first device, and returning response data to the first device via the USB interface in a case that the external device receives the data request sent by the first device via the USB interface and there is no data in the send cache, and the first interface is used for the first device.

3. The method according to claim 1, wherein step T1 further comprises: storing, by the external device, a detecting instruction in the send cache;
   between step T1 and step T2, the method further comprises:
   step Z1, in a case that the external device receives the data request sent by the first device via the USB interface, determining, by the external device, whether there is data in the send cache; if yes, sending the detecting instruction in the send cache to the first device via the USB interface and receiving support authentication protocol information sent by the first device, and negotiating synchronization packet data with the first device; otherwise, returning, by the external device, response data to the first device via the USB interface; and
   step Z2, in a case that the external device receives authentication success information and a device authentication instruction sent by the first device via the USB interface, organizing, by the external device, an authentication response and storing the authentication response in the send cache, and returning the authentication response in the send cache to the first device via the USB interface.

4. The method according to claim 3, wherein before step Z2,
   the method further comprises:
   in a case that the external device receives a certificate acquisition instruction sent by the first device via the USB interface, reading, by the external device, a certificate from an internal authentication chip and storing the certificate in the send cache, and returning the certificate in the send cache to the first device via the USB interface; and
   in a case that the external device receives a challenge instruction sent by the first device via the USB interface, parsing, by the external device, the challenge instruction and sending a challenge value obtained by parsing to the internal authentication chip, reading a challenge value signature result from the internal authentication chip and storing the challenge value signature result in the send cache, and returning the challenge value signature result in the send cache to the first device via the USB interface.

5. The method according to claim 1, wherein the generating, according to the key-value data, an attaching report command and storing the attaching report command in the send cache in step T4 comprises: converting the key-value data into key-pressing information, generating an attaching report command according to the key-pressing information and storing the attaching report command in the send cache.

6. An apparatus for implementing an external device simulating a keyboard, wherein the apparatus is connected to a first device to work, the apparatus comprising: a memory and a processor; wherein
   the memory is configured to store executable instructions of the processor; and
   the processor, when executing the executable instructions, is configured to execute the following steps:
   step T1, establishing a physical connection between the apparatus and a first device, waiting for receiving a data request continuously sent by the first device, returning response data to the first device via a universal serial bus (USB) interface in a case that receiving the data request sent by the first device via the USB interface and there is no data in a send cache of the apparatus, and performing step T2 in a case that a user pressing a key is detected in a process that the apparatus is waiting for receiving the data request continuously send by the first device, wherein the first device is a device using a mobile operating system;

step T2, generating key-value data, organizing a start command according to a preset human interface device (HID) identifier and storing the start command in the send cache, and setting a sending identifier as a first preset value; wherein the start command is used for declaring that the apparatus is a keyboard device;

step T3, in a case that the data request sent by the first device is received via the USB interface, determining whether the sending identifier is the first preset value; if yes, sending the start command in the send cache to the first device via the USB interface and clearing the send cache, waiting for receiving the data request continuously sent by the first device, and performing step T4; otherwise, returning response data to the first device via the USB interface;

step T4, in a case that is detected that the send cache is cleared, generating, according to the key-value data, an attaching report command and storing the attaching report command in the send cache, and setting the sending identifier as a second preset value;

step T5, in a case that the data request sent by the first device is received via the USB interface, determining whether the sending identifier is the second preset value; if yes, sending the attaching report command in the send cache to the first device via the USB interface and clearing the send cache, waiting for receiving the data request continuously sent by the first device, and performing step T6; otherwise, returning response data to the first device via the USB interface;

step T6, in a case that it is detected that the send cache is cleared, organizing an end command and storing the end command in the send cache, and setting the sending identifier as a third preset value; and step T7, in a case that the data request sent by the first device via the USB interface is received, determining whether the sending identifier is the third preset value; if yes, sending the end command in the send cache to the first device via the USB interface and clearing the send cache and the sending identifier, waiting for receiving the data request continuously sent by the first device; otherwise, returning response data to the first device via the USB interface-.

7. The apparatus according to claim 6, wherein the processor, when executing the executable instructions, is further configured to: after establishing the physical connection with the first device via a first interface, perform hardware system initializing; receive the data request continuously sent by the first device, and return response data to the first device via USB interface in a case that the data request sent by the first device via the USB interface is received and there is no data in the send cache, and the first interface is used for the first device.

8. The apparatus according to claim 6, wherein the processor, when executing the executable instructions, is further configured to: store a detecting instruction in the send cache;

between step T1 and step T2, the processor, when executing the executable instructions, is further configured to execute the following steps:

step Z1, in a case that the data request sent by the first device via the USB interface is received, determining whether there is data in the send cache; if yes, sending the detecting instruction in the send cache to the first device via the USB interface and receiving support authentication protocol information sent by the first device, and negotiating synchronization packet data with the first device; otherwise, returning response data to the first device via the USB interface; and step Z2, in a case that authentication success information and a device authentication instruction sent by the first device via the USB interface is received, organizing an authentication response and storing the authentication response in the send cache, and returning the authentication response in the send cache to the first device via the USB interface.

9. The apparatus according to claim 8, wherein the processor, when executing the executable instructions, is configured to:

in a case that a certificate acquisition instruction sent by the first device is received via the USB interface, read a certificate from an internal authentication chip and store the certificate in the send cache, and return the certificate in the send cache to the first device via the USB interface; and in a case that a challenge instruction sent by the first device is received via the USB interface, parse the challenge instruction and send a challenge value obtained by parsing to the internal authentication chip, read a challenge value signature result from the internal authentication chip and store the challenge value signature result in the send cache, and return the challenge value signature result in the send cache to the first device via the USB interface.

10. The apparatus according to claim 6, wherein when generating, according to the key-value data, an attaching report command and storing the attaching report command in the send cache in step T4, the processor is further configured to: convert the key-value data into key-pressing information, generate an attaching report command according to the key-pressing information and store the attaching report command in the send cache.

* * * * *